(12) United States Patent
Aiken et al.

(10) Patent No.: US 7,089,335 B2
(45) Date of Patent: Aug. 8, 2006

(54) BRIDGING MULTIPLE NETWORK SEGMENTS AND EXPOSING THE MULTIPLE NETWORK SEGMENTS AS A SINGLE NETWORK TO A HIGHER LEVEL NETWORKING SOFTWARE ON A BRIDGING COMPUTING DEVICE

(75) Inventors: Mark A. Aiken, Seattle, WA (US); Gurdeep S. Pall, Sammamish, WA (US); Dennis A. Morgan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 09/906,328

(22) Filed: Jul. 16, 2001

(65) Prior Publication Data

US 2002/0087710 A1 Jul. 4, 2002

Related U.S. Application Data

(60) Provisional application No. 60/244,425, filed on Oct. 30, 2000.

(51) Int. Cl.
*G06F 15/16* (2006.01)
(52) U.S. Cl. .................. 709/250; 709/220; 709/224; 710/1; 707/100
(58) Field of Classification Search ................ 710/1; 709/220, 224, 250; 707/100
See application file for complete search history.

(56) References Cited

U.S. PATENT DOCUMENTS 5,371,852 A * 12/1994 Attanasio et al. ........... 709/245
5,938,736 A * 8/1999 Muller et al. ............... 709/243

OTHER PUBLICATIONS

Qiwel, G.; Minghua, W.; Xuekui, S., The design of bridge between ARCNET and ETHERNET, Journal of Nanjing University of Aeronautics and Astronautics Oct., 1995 vol. 27, No. 5, p.; 674-680.

(Continued)

*Primary Examiner*—Ilwoo Park
(74) *Attorney, Agent, or Firm*—Microsoft Corporation

(57) ABSTRACT

A software network bridge is disclosed which allows the connected network segments to be presented as a single network unit to the host computer. The software bridge can be implemented as an intermediate network driver, abstracting multiple network segments into a single network interface for higher level protocols and applications. While the intermediate network driver acts as a software bridge implementing the Spanning Tree Algorithm, it also acts a network interface driver to higher level protocols, conglomerating information from the multiple underlying network interface cards and forwarding along commands from the higher level software to the appropriate network interface card. The intermediate network driver can also simultaneously send the same data packet through multiple network interfaces by creating multiple packet descriptors, each pointing to the same data, but each given individually to the underlying network interfaces to control during their transmission. Further efficiencies can also be achieved by the software bridge, implemented as an intermediate network driver, through the use of a dynamic allocation scheme which increases the size of the useable buffers of each network interface without increasing the overall memory consumption, and the use of a queuing scheme which preliminarily examines incoming data packets to determine if any processing needs to be performed, and queues the packets should they require processing. Additionally, a user interface is presented exposing this functionality of the intermediate network driver.

10 Claims, 11 Drawing Sheets

OTHER PUBLICATIONS

Yonggao, Y.; Tingting, Z.; Qijing, P.; Qing, H., The design and implementation of IEEE 802.3 transparent network bridge, Mini-Micro Systems Mar. 1994 vol. 15, No. 3 p. 40-45.

Microsoft Corporation, NDIS Intermediate Drivers, Windows 2000 DDK, 2000, pp. 1-115, Microsoft Corporation, Redmond USA.

Technical Committee on Computer Communications of the IEEE Computer Society, Information technology - Telecommunications and information exchange between systems - Local area networks - Media access control (MAC) bridges, 1993 edition, pp. 1-179, The Institute of Electrical and Electronics Engineers, Inc.

* cited by examiner

BRIDGING MULTIPLE NETWORK SEGMENTS AND EXPOSING THE MULTIPLE NETWORK SEGMENTS AS A SINGLE NETWORK TO A HIGHER LEVEL NETWORKING SOFTWARE ON A BRIDGING COMPUTING DEVICE

RELATED APPLICATION

This application is related to, and claims priority from, U.S. Provisional Application No. 60/244,425, entitled "Principle of Exposing a Bridged Network as a Single Virtual Segment", and filed on Oct. 30, 2000.

TECHNICAL FIELD

This invention relates generally to computer networks and, more particularly, relates to a software network bridge on a host computing device.

BACKGROUND OF THE INVENTION

As personal computer prices have decreased, and the number of personal computers purchased has increased, many households and small businesses find themselves with more than one useful computer. Often this results in individuals with their own machine, who would otherwise be forced to share a computer. While it is beneficial for family members and employees to have their own computers, information sharing between the computers becomes more problematic. For example, in a family with only one computer, a report being written by one of the children would be located on that system only. However, in a family which shares two or more computers, the report might be located on a computer which is currently in use by a sibling, or different versions of the report might be located on different machines. Similarly, a business with more than two computers may have some records stored on each machine, and may even have different versions of the same record on each machine.

One solution would be to network the computers together such that the data stored on each computer is available to every other computer. Thus, one member of the family could have access to their report without regard to which machine it was last edited and saved on; and employees can have access to every record regardless of which system is currently available for them to use. Networking also shares personal computer peripherals. For example, while new computers were often purchased to take advantage of increases in processing power, printers have not experienced such dramatic improvements, and were not upgraded as often. Therefore, while many families and small business may have two or more computers of varying age and speed, they often only have one printer. A computer network allows each computer to have access to the printer. Similarly, other peripherals such as backup storage devices and scanners, can also be shared.

The recent trend towards affordable fast Internet connections is also increasing the need for families and small business to network their computers together. Generally, fast connections to the Internet and World Wide Web were reserved for larger businesses who could justify the high cost of such connections. More recently, as the cost of high speed Internet access has decreased, more small businesses and families can afford high speed Internet access. Access to the Internet through the high speed connection can be shared through a computer network in a similar fashion to the sharing of peripherals.

Because of the existence of a number of different networking technologies, each with its own benefits and drawbacks, families and small businesses often need to integrate two or more different types of networks. A family may have an Ethernet network connecting two ore more desktop computers together and sharing a printer and a high speed Internet connection, and they may also have a wireless network connecting a laptop to one of the desktop computers. The difficulty arises when the laptop user wishes to gain access to the printer and high speed Internet connection. Generally, such home and small business networks rely on simple, if any, networking hardware, and can be connected by a simple cable and software on the computers themselves. However to combine the wireless network with the Ethernet network, the family would either have to purchase, or implement through software, a router or a bridge to connect the two networks. Routers are often difficult for an average computer user to set up properly, exposing the user to networking complexities. Bridging is a more simple solution, requiring little or no configuration by the user. When two network segments are connected with a bridge, the computers on each segment perceive the bridged multi-segment network as if it consisted of only one segment. However, to software on the bridging computer, the segments still appear distinct and separate.

Because the bridged segments still appear as separate on the bridging computer, software components on that computer may operate inefficiently. In fact, such network components may not even operate properly on a bridging computer, or may require a complex and tedious setup. For example, if the interconnected network used the Transmission Control Protocol/Internet Protocol (TCP/IP), and the TCP/IP network component on the bridging computer was bound to both network segments, it would require that each segment be considered as an separate IP subnet. However, a major benefit of bridging is that the entire multi-segment network can be treated as a single IP subnet. Hence the bridging computer would have to bind its TCP/IP network component to only a single network segment, relying on the bridge to transfer packets to the other segments. However, if the network segment to which the TCP/IP component is bound is a slow network, the TCP/IP component will not be able to take advantage of the faster network segments, slowing the entire interconnected network. Furthermore, the processing of outbound packets would be inefficient because the TCP/IP component would transmit the packets onto the network segment to which it is connected, even if the destination computer is not on that network segment. Similarly, inbound packet handling would also be inefficient because the bridge would have to transfer every packet destined for the bridging computer from the network segment on which it was originally sent to the network segment to which the TCP/IP network component is bound. This wastes bandwidth and creates an inefficient network.

Additionally, because network components are needed by higher level software to perform tasks such as web browsing, and saving and editing files across a network, the only alternative to the inefficiencies described above is for the user to avoid using the bridging computer for anything other than the most rudimentary tasks, thereby eliminating the need for many network components. However, most families and small businesses do not have the resources to dedicate an entire computer to act as a bridge between network segments. A solution, therefore, is required which would allow network components on the bridging computer to perceive the bridged network as a single entity, allowing families and small business to continue to use the bridging computer without restrictions.

SUMMARY OF THE INVENTION

Accordingly, the present invention provides a system for bridging multiple network segments with a software bridge and exposing the network segments as one network to the computer running the bridge and to network components on that computer.

The present invention additionally provides a method for efficiently transmitting a packet of information simultaneously through more than one network interface. The present invention also provides a system for dynamically allocating resources such that each network interface receives more usable memory than a fair static allocation scheme would allow.

The present invention additionally provides a method for returning processing to the network interface driver as quickly as possible by implementing a queuing scheme for received data.

The invention solves the above difficulties encountered when operating a software bridge on a computer by providing a novel method and system for exposing, to the computer running the bridge and to the network components on the computer, the bridged network segments as a single network unit. The network components perceive only the single network unit and, therefore, operate properly and efficiently. Similarly, by allowing those higher level network applications to simultaneously send the same data across all of the network connections, should such a broadcast be necessary, the present invention increases the efficiency of the multiple network connections, as accessed by the bridging computer.

The present invention can be implemented as an intermediate network driver which acts as a network bridge complying with the Spanning Tree Algorithm. The Spanning Tree Algorithm ensures that, in a network with multiple bridges, even if the physical topology creates loops, the bridges do not forward the same packet over and over again in a circular fashion. Each bridge is required to have a unique identification number. The lowest number bridge becomes, by default, the root bridge. The Spanning Tree Algorithm then denominates each port of each bridge as either a root port, a designated port, or neither. Ports classified as root ports or designated ports can forward and receive packets, but ports which are neither are set to a blocking state and do not forward, nor receive packets.

The intermediate network driver contemplated by the present invention also abstracts the multiple network segments into a single virtual network for the host computer. When accessed by higher level protocols, the intermediate network driver appears to be controlling only one network interface card (NIC). However, when communicating with the multiple underlying NICs, the intermediate network driver acts as a standard network protocol to each NIC. To effectively present itself as a NIC single driver, while accepting and providing information for multiple underlying NICs, the intermediate driver contemplated by the present invention conglomerates, in a request specific manner, information from the underlying NICs to present to higher level protocols in response to queries from those protocols, and forwards requests and instructions from the higher level protocols onto each NIC.

Because multiple NICs are controlled by the intermediate network driver contemplated by the present invention, efficiencies exist when the intermediate driver must send the same packet to more than one NIC. Each NIC can be given control of a packet descriptor, which identifies the location in memory of the data of the packet, which is to be sent by the NIC. Thus, each NIC can individually release control of its own packet descriptor when it has completed sending the information. The intermediate driver contemplated by the present invention creates duplicate packet descriptors, each identifying the same data in the same memory locations, such that each individual NICs can be given control of a separate packet descriptor at the same time. The present invention then tracks the packet descriptors, and releases the memory locations holding the data to be sent when all NICs have completed their transmission. This is efficient because the packet data, which is usually much larger and more expensive to copy than a packet descriptor, need not be duplicated in memory. The present invention also contemplates the maintenance of a pointer to an original packet descriptor, such that the intermediate network driver can accomplish multiple sends in parallel even in the situation where it is not permitted to make use of the packet descriptor originally furnished to it.

Further efficiencies can be realized through the intermediate network driver contemplated by the present invention, such as a dynamic buffer allocation scheme which can provide more buffer space to an individual NIC than a static allocation scheme, without increasing the overall consumption of memory by the networking subsystem. Because the present invention can be implemented as an intermediate network driver which controls multiple NICs, the intermediate driver can apportion the buffer storage to each NIC from the total memory available to the network subsystem. As a network segment experiences a slow down, requiring more data to be buffered by the NIC, the intermediate driver can grant to that NIC more memory than it would have received under a static allocation scheme so long as the amount of free memory remaining at the intermediate driver's disposal is greater than a pre-determined amount, which acts as a safety buffer. Should a second network segment experience a slowdown, the intermediate network driver contemplated by the present invention can grant the second NIC memory from the safety buffer. As the first NIC transmits data and clears some buffers, and as its requests for additional buffers are declined, its share of memory decreases, and the second NIC can thereby be granted more buffer space. Thus, the dynamic allocation scheme implemented in the intermediate driver of the present invention provides more usable memory to the NICs, in situations where only a few network segments are experiencing a slowdown, by allowing the buffer sizes to expand past the size provided by a static allocation scheme.

The intermediate network driver contemplated by the present invention can also provide queuing of received data such that processing can be returned quickly to the underlying NIC driver. Initially, when a packet of data is received by the NIC, the present invention provides for a minimal analysis to be performed on the packet to determine if the packet is to be processed. Packets from one computer on a network segment to another computer on the same segment do not need to be processed by the present invention, while packets directed to other network segments or the host computer require processing. Should a packet require processing, the packet can be placed on a queue for later processing. The initial analysis allows processing to be returned to the NIC driver in a relatively constant and efficient amount of time, and allows the processing of received packets to be more evenly distributed between the NICs controlled by the present invention.

A user interface to the intermediate network driver is also contemplated by the present invention. An exemplary user interface would allow access to the bridging functionality of the intermediate network driver and would also provide a single element for the bridged network segment. Also, an exemplary user interface would prevent the user from modifying an individual bridged network segment so that it did not conform to the settings of the bridged network. Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
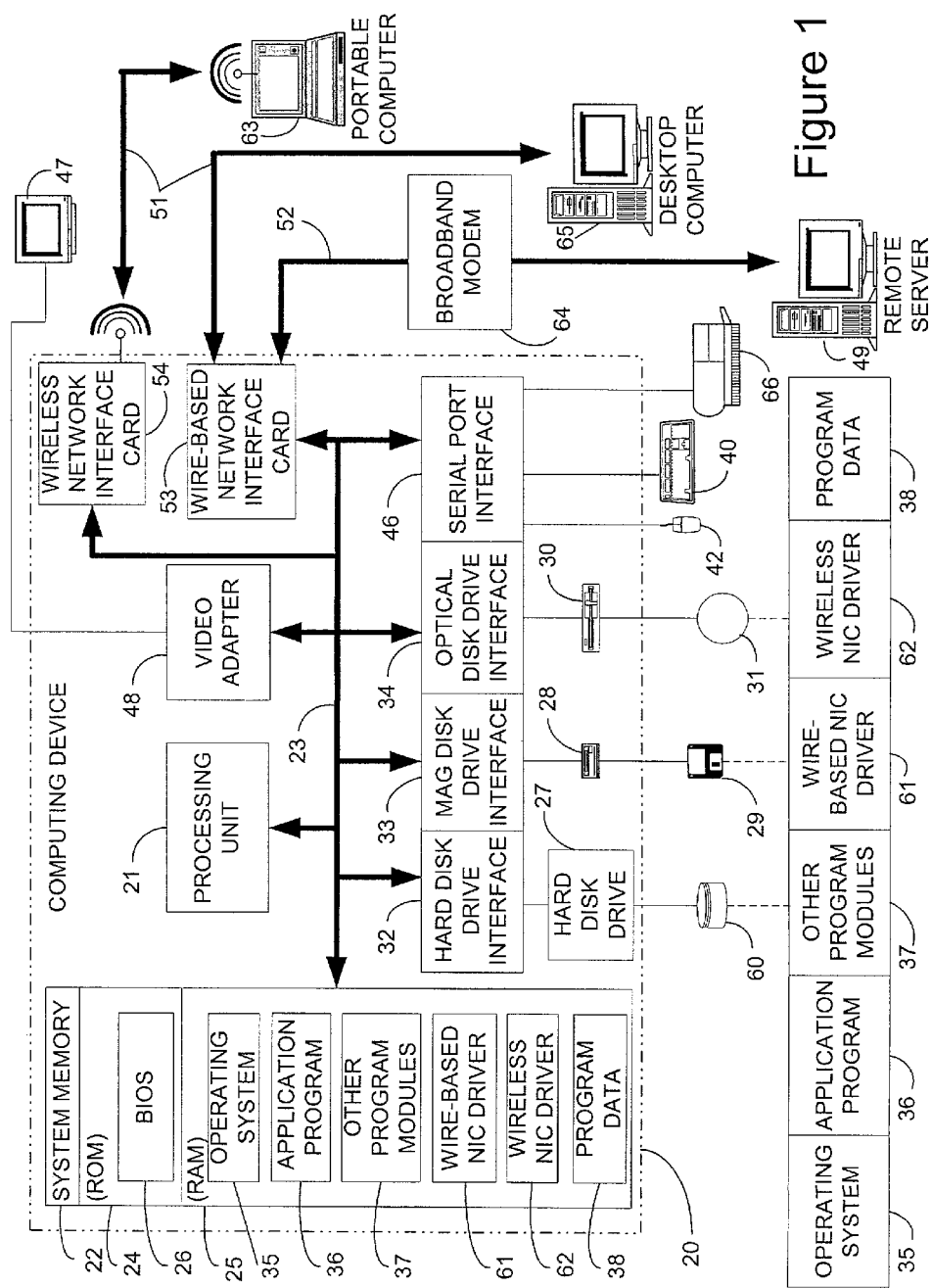
FIG. 1 is a block diagram generally illustrating an exemplary computer system on which the present invention resides.

Turning to the drawings, wherein like reference numerals refer to like elements, the invention is described hereinafter in the context of a computing environment. As will be described in detail below and with reference to the attached drawings, the invention is a software network bridge which exposes the network segments as a single network unit to the host computer, implements a software bridge conforming with the Spanning Tree Algorithm, allows for the same data to be sent to multiple network segments simultaneously, assigns buffer space using a dynamic memory allocation scheme, and provides for efficient initial analysis and queuing of incoming packets. Although it is not required for practicing the invention, the invention is described as it can be implemented by computer-executable instructions, such as program modules, that are executed by a computing device. Generally, program modules include routines, programs, objects, components, data structures and the like that perform particular tasks or implement particular abstract data types.

The invention may be implemented in any number of computing devices, such as personal computers (PCs), handheld devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices.

Although the software network bridge may be incorporated into many types of computing environments as suggested above, the following detailed description of the invention is set forth in the context of an exemplary general-purpose computing device 20 as shown in FIG. 1. Before describing the invention in detail, the computing environment in which the invention operates is described in connection with FIG. 1.

Turning to FIG. 1, the computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs, such as application program 36, other program modules 37, program data 38, and networking software components and drivers, such as wire-based network interface card (NIC) driver 61 and wireless NIC driver 62. A user may enter commands and information into the computing device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. Additionally, a printer 66 or other hard copy output device is connected to the computing device 20 through the serial port interface 46 or other interface, such as those listed above. In addition to the monitor and printer, computing devices typically include other peripheral output devices, such as speakers, which are not shown.

The computing device 20 may operate in a networked environment using logical connections to one or more additional computing devices, such as a remote server 49, a portable computer 63 and a desktop computer 65. The remote server 49 may be another computing device, such as a server, a router, a network PC, a peer device or other common network node, and typically includes many or all of the elements described above relative to the computing device 20. The portable computer 63 may be another computing device, such as a portable personal computer, a pen-based portable computer, a handheld computer, or a personal organizer, and also typically includes many or all of the elements described above relative to the computing device 20. Similarly, the desktop computer 65 may be another PC, a workstation, a server, or a network PC, and also typically includes many or all of the elements described above relative to the computing device 20. The logical connections depicted in FIG. 1 include a local area network (LAN) 51 and a wide area network (WAN) 52. Such networking environments are commonplace in homes, offices, enterprise-wide computer networks, intranets and the Internet.

When used in a LAN networking environment, the computing device 20 can be connected to the local network 51 through a network interface or adapter, such as a wire-based Network Interface Card (NIC) 53 or a wireless NIC 54. When used in a WAN networking environment, the computing device 20 typically includes a broadband modem 64, such as a cable modem or Digital Subscriber Line (DSL) modem, or other means for establishing communications over the WAN 52. The broadband modem 64, which may be internal or external, is connected to the computing device 20 through a wire-based NIC 53. In a networked environment, program modules depicted relative to the computing device 20, or portions thereof, may be stored in the remote server 49 or the portable computer 63. It will be appreciated that the network connections shown are exemplary and other means of establishing a communications link between the computers may be used.

In the description that follows, the software network bridge contemplated by the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
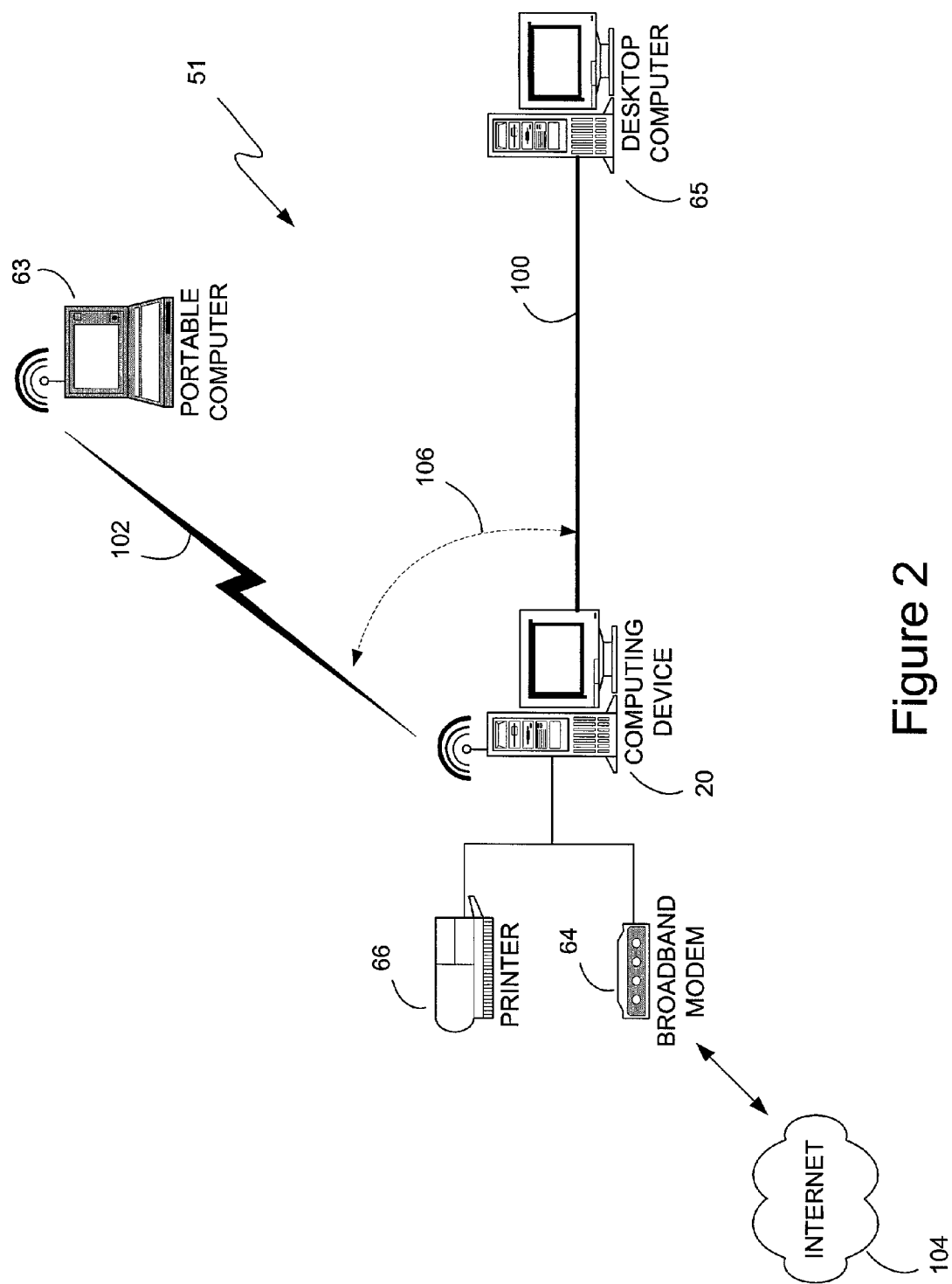
FIG. 2 is a block diagram generally illustrating an exemplary computer network environment in which the present invention operates.

In accordance with one important aspect of the invention, a software bridge for connecting two network segments can be implemented on a bridging computer as an intermediate network interface driver. Turning to FIG. 2, the connections shown in FIG. 1 are presented again in a more simplified format. Computing device 20 is connected via a wire-based connection 100, such as an Ethernet connection, to a desktop computer 65. Computing device 20 and desktop computer 65 can be two computers within the same household or small business. Computing device 20 also has a wireless connection 102 such as a wireless Ethernet connection, to the portable computer 63. The portable computer 63 can also be a computer within the same household or small business as computing device 20 and desktop computer 65. Computing device 20 also maintains connections to a printer 66 and a broadband connection to the Internet 104 through the broadband modem 64. By networking the computing device 20, desktop computer 65 and portable computer 63 into a virtual LAN 51 shown in FIG. 2, each of the computers can access shared resources, such as the printer 66 and the broadband Internet connection through modem 64.

Figure 3:
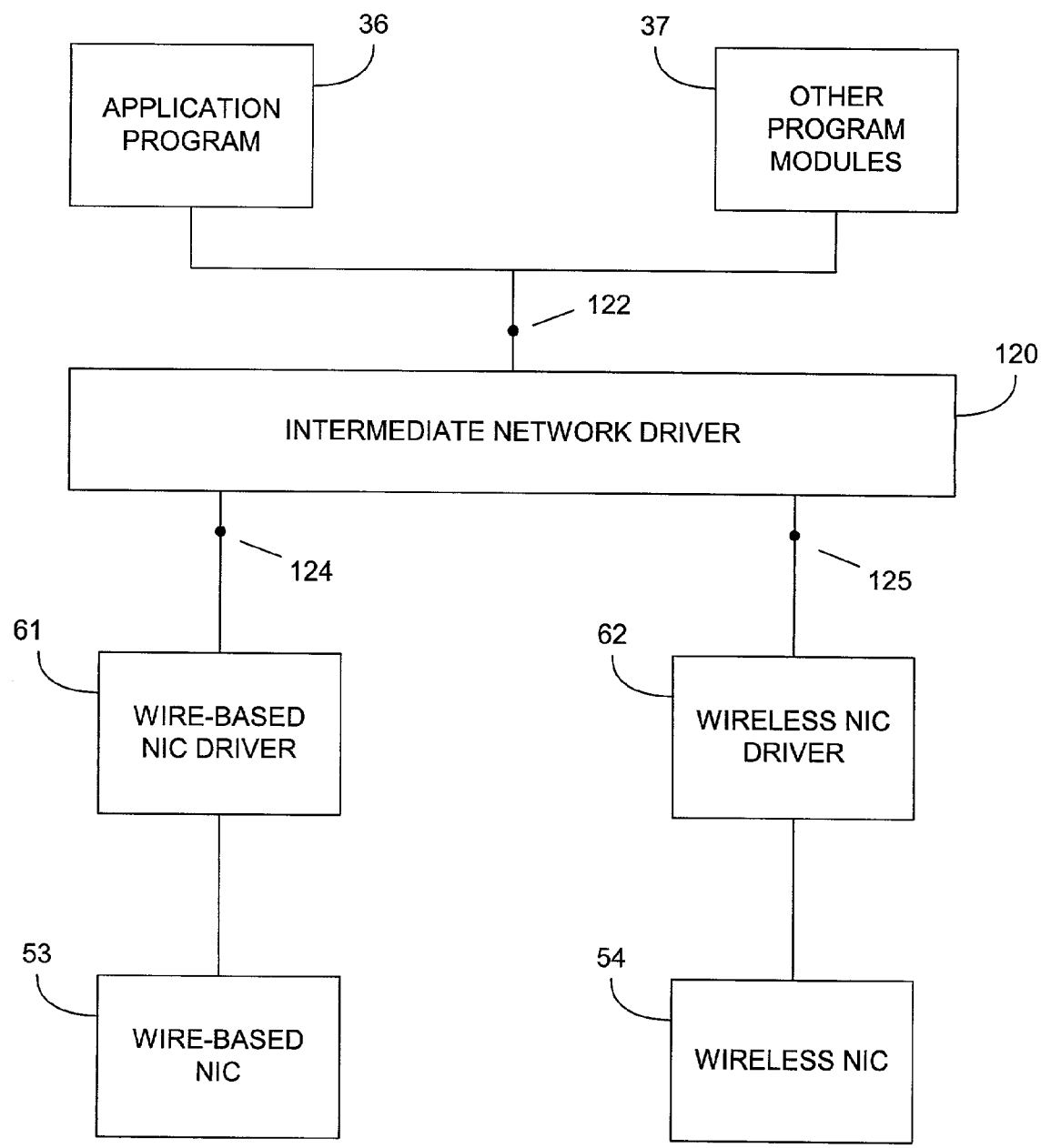
FIG. 3 is a block diagram generally illustrating the networking layers in which the present invention operates.

To allow portable computer 63 access to the information stored on the desktop 65, a software bridge 106 can be implemented on computing device 20, linking the wire-based network 100 with the wireless network 102. The software bridge can be implemented as an intermediate network driver 120 as shown in FIG. 3. The intermediate network driver 120 can bridge the wire-based network 100 with the wireless network 102 by receiving data from each network and passing it onto the other network, as appropriate. For example, as shown in FIG. 3, the intermediate network driver can receive data from either the wire-based NIC driver 61 or the wireless NIC driver 62 through lower-level protocol interfaces 124 and 125. The intermediate network driver 120 can then determine whether the data is meant for the host computing device 20, or whether it was sent to a machine on a different network segment, and the intermediate driver 120 can then pass the data up to the applications on the host computing device through a higher level network interface 122 or back down through the protocol interfaces 124 and 125 to the appropriate network segment, as necessary. As will be described in more detail below, the software bridge implemented by the intermediate driver 120 can conform to the Spanning Tree Algorithm. In a LAN in which the physical layout of the network contains loops, such that multiple bridges connect the various network segments in one or more loops, the Spanning Tree Algorithm can ensure that the multiple bridges do not continue to forward the same data continuously around the network. Thus, by implementing the Spanning Tree Algorithm, the software bridge can insure its operation in any network topology.

In addition to acting as a bridge between the network segments, the software bridge implemented in the intermediate network driver 120 can also expose only one higher level interface 122 to higher level networking software, including higher level applications and protocols, such as application program 36 and other program modules 37, exposing the various network segments as one network to higher-level software on the host computing device 20. Returning to FIG. 2, with the bridge 106 operational and connecting the wire-based network segment 100 with the wireless network segment 102, the desktop computer 65 and the computing device 20 appear to the portable computer 63 to be on the same network segment, namely the wireless network segment 102. Similarly, the portable 63 and the computing device 20 appear to the desktop 65 to be on the same network segment, namely the wire-based network segment 100. However, a simple software bridge on computing device 20 will maintain the two network segments 100 and 102 as separate when viewed from the computing device 20. The current invention presents, to the software bridge host computing device 20, desktop 65 and portable 63 as two computers on the same network segment. By exposing a single higher level interface 122, as shown in FIG. 3, the intermediate network driver 120 allows higher level software to send data to either the portable 63 or desktop 65 through the same interface. Since the portable 63 and the desktop 65 are accessed through what appears to higher level software to be the same network interface, they are presented to that higher level software as being on the same network segment. This significantly simplifies the configuration of higher-level software modules on the computing device 20.

In order to present the single higher level interface 122, the intermediate network driver conglomerates, in a request specific manner, information from the lower level drivers 61 and 62 and presents this information to higher level networking software, including higher level applications and protocols, such as application program 36 and other program modules 37. For example, as will be described further below, higher level applications and protocols can query information from the NICs, such as the maximum speed of the network, or the current number of sent packets. The intermediate network driver 120 receives these requests and responds to them by conglomerating the information from the lower level drivers 61 and 62. For example, the intermediate driver 120, upon receiving a request for the number of sent packets, can query the wire-based NIC driver 61 and the wireless NIC driver 62 each for the number of packets each has sent. The intermediate driver 120 can then add these numbers together and provide the sum as the response to the higher level request. Alternatively, the intermediate driver 120 can continually monitor the number of packets sent by the NIC driver 61 and the wireless NIC driver 62, conglomerating the information in real-time. The intermediate driver 120 can then respond to a request for the number of packets sent by itself, without the need to query underlying drivers. By conglomerating the information, the intermediate driver 120 can continue to present network segments 100 and 102 as a single network segment to the host computer 20. As will be described further below, the intermediate driver 120 can also pass along to the appropriate drivers 61 or 62 set requests from higher level applications.

In accordance with a second important aspect of the invention, the intermediate network driver 120 of FIG. 3 can simultaneously send, through the wire-based NIC 53 and the wireless NIC 54, the same data. As is known by those of skill in the art, data is sent across a network by providing the data to a network interface and granting the interface control over that data until it has finished sending it across the network. When the transmission has completed, the control of the data can be returned by the network interface, and the data can be subsequently modified. The present invention monitors the transmission of the data by both of the NICs 53 and 54 and does not release the data to the transmitting application until both of the NICs have finished transmitting. In such a manner, a single copy of the data can be transmitted simultaneously by multiple interfaces, avoiding the need to make additional copies of the data, or transmitting it first through one interface and then another.

Figure 4:
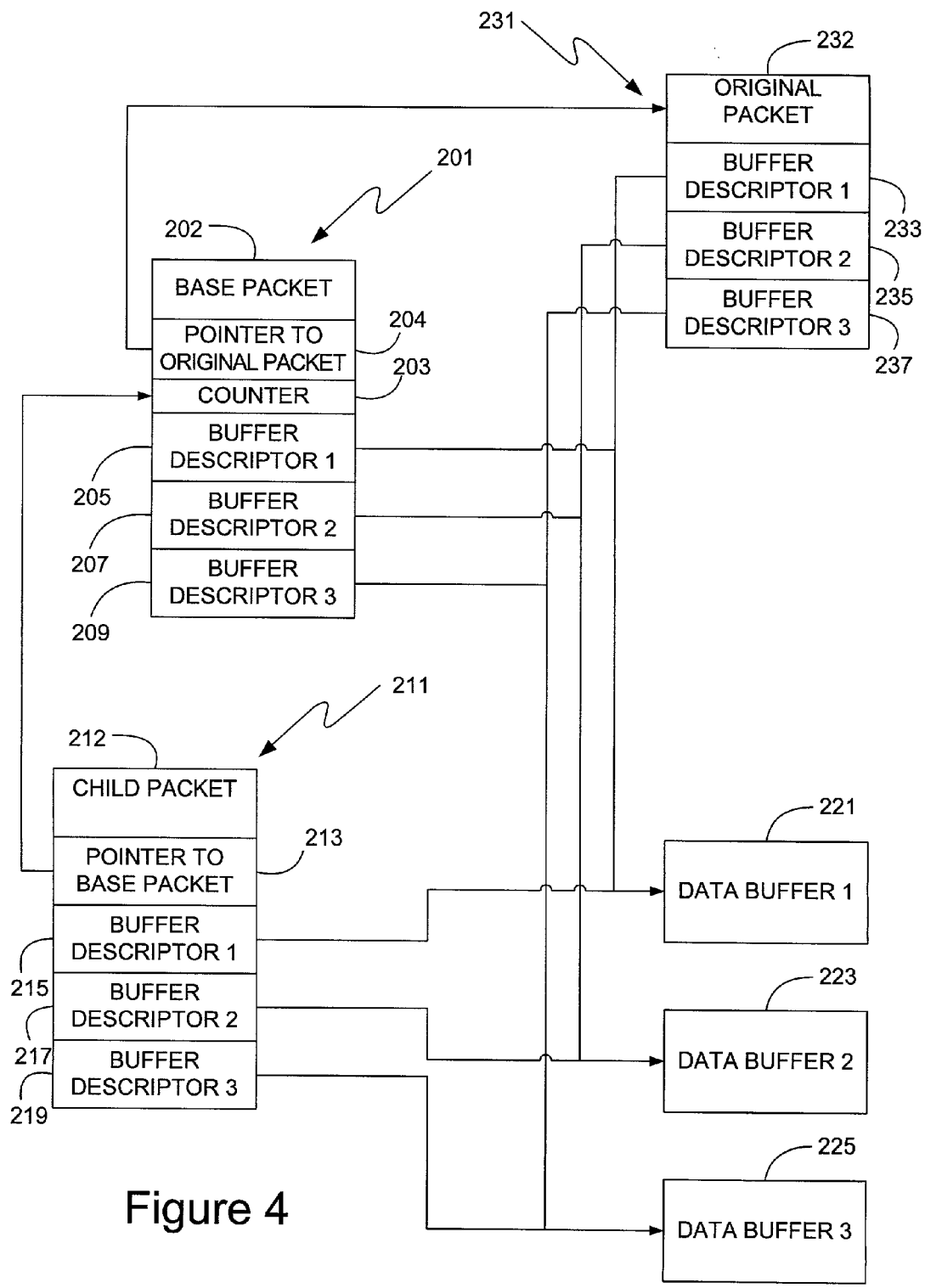
FIG. 4 is a block diagram generally illustrating the packet structure used by the present invention.

Turning to FIG. 4, an exemplary data packet 231 is shown. The data packet 231 is the original packet provided to the intermediate driver 120, and is structured such that the data is stored in data buffers 221, 223, and 225, whose location in memory is pointed to by buffer descriptors 233, 235, and 237. The present invention can create a new packet, base packet 201, which refers to the same data stored in data buffers 221, 223, and 225. The base packet 201 points to the data buffers with buffer descriptors 205, 207, and 209. It is important to note that the base packet 201, containing only buffer descriptors, occupies significantly less memory than the data of the packet 231, which is stored in buffers 221, 223, and 225. The base packet 201 contains two elements in addition the buffer descriptors, namely the pointer 202 to the original packet 231 and the counter 203. The counter 203 tracks the number of child packets of the base packet still in existence. Should the intermediate network driver 120 of the present invention need to send the same data packet simultaneously through both the wire-based network segment 100 and the wireless network segment 102, it can create an additional packet, such as child packet 211. Child packet 211 also refers to the data in buffers 221, 223, and 225, pointed to by the child packet's own buffer descriptors 215, 217, and 219. However, instead of a counter, the child packet 211 contains a pointer 213 to the base packet 201. For each child packet pointing to the base packet, the counter 203 in the base packet is incremented by the intermediate network driver 120. Child packet 211, like based packet 201, occupies significantly less memory than the data to be transmitted, which is stored in buffers 221, 223, and 225. By creating a child packet which only points to the data, the present invention avoids the need to duplicate the data itself. Thus, significant memory savings can be achieved because the intermediate driver 120 need only maintain one copy of the data itself, namely buffers 221, 223, and 225.

After creating a base packet and sufficient child packets, the intermediate driver 120 can then send the data simultaneously across multiple network segments by providing, to the interface of each network segment, one of the packets. For example, packet 201 can be given to the wire-based NIC driver 61 to send across the wire-based network segment 100 and packet 211 can be given to the wireless NIC driver 62 to send across the wireless network segment 102. Assuming that the wire-based NIC 53 has a higher data throughput than the wireless NIC 54, it may finish sending the packet first. However, the intermediate network driver 120 will not release control of the data to the higher level transmitting application because the counter 203 is not zero, since the wireless NIC 54 is still sending the child packet 211. When the wireless NIC 54 completes its send, it can return control of packet 211 to the intermediate driver 120. The intermediate driver 120 can discard the child packet, decrement the counter 203 in the base packet, and then discard it as well, and return control of the original packet 231 to the sending application since the counter of the base packet will be zero. The invention can thereby accomplish multiple sends of the same data in parallel while maintaining the appearance of a single network segment to higher level applications. Furthermore, because the intermediate network driver 120 does not copy the data itself, contained in the data buffers, the present invention provides the ability to perform multiple sends in parallel without a significant increase in memory consumption.

In accordance with another important aspect of the invention, a dynamic memory allocation scheme can be used to more efficiently and fairly allocate memory among the NIC drivers controlled by the present invention. Returning to FIG. 3, the intermediate network driver 120 can be granted a pre-determined amount of memory to act as buffer storage for the multiple lower level interfaces. The share of the intermediate network driver's memory used to store packets for an individual lower level interface is that lower level interface's buffer. Should an interface be granted too little memory as a buffer, its ability to queue packets for later transmission in the event of a network slowdown will be diminished, resulting in discarded packets and poor performance. Therefore, the intermediate network driver 120 manages the buffer storage memory by attempting to dynamically grant as much memory as possible to the interface which currently is in need of buffer space, while maintaining some amount of memory in reserve should another interface require an increase in its buffer size.

The memory available to the intermediate driver 120 can be divided by the number of network interfaces the driver abstracts. Thus, in FIG. 3, the memory available can be divided among the wire-based NIC driver 61 and the wireless NIC driver 62. Each, therefore, is allocated half of the total amount, which is deemed to be the interface's "fair share". Additionally, some of the memory initially allocated to the intermediate driver 120 can be set aside as a "safety buffer". The dynamic memory allocation scheme contemplated by the present invention operates by storing a packet for a requesting interface if the current memory allocated to the interface is less than that interface's fair share. The dynamic memory allocation scheme can continue to store packets for a requesting interface even after the memory allocated to the interface has exceeded its fair share, as long as the amount of memory remaining unused is larger than the safety buffer. Thus, with the system shown in FIG. 3, should the wireless NIC 54 experience a slowdown and require additional buffer space, the intermediate network driver 120 can initially store packets for the wireless NIC driver 62 up to its fair share;

namely half of the memory available to the intermediate driver 120. Should the wireless NIC driver 62 need still to buffer more packets, the intermediate driver can assign more of its memory to buffering packets for the wireless NIC driver 62, assuming that the wire-based NIC 53 is not simultaneously experiencing a slowdown. The wireless NIC driver 62 can, thereby, be allowed to use more memory that it would under a static memory allocation scheme.

The dynamic memory allocation scheme reclaims buffer space once the packet stored therein has been transmitted by the NICs, thereby constantly refreshing its pool of available memory. Returning to the situation described above, where packets buffered for the wireless NIC driver 62 have consumed all of the available memory except for the safety buffer; if the wire-based NIC 53 also experiences a network slowdown, packets destined for the wire-based NIC driver 61 can initially be stored in the free memory remaining as the safety buffer. As the wireless NIC 54 sends packets, the wireless NIC driver 62 will no longer need to buffer those packets, and the intermediate network driver 120 can return the memory buffering those packets into the pool of free memory.

However, further requests to the intermediate driver 120 by the wireless NIC driver 62 to buffer new packets can be declined by the intermediate driver, since the total memory remaining is now less than the safety buffer. As a result, the memory used to buffer packets destined for the wireless NIC driver 62 decreases. Concurrently, requests to the intermediate driver 120 by the wire-based NIC driver 61 to buffer packet destined for the wire-based NIC driver 61 will continue to be granted as that network segment has not yet used up its fair share of memory. In such a manner, the dynamic allocation scheme can assign a large amount of memory to one network segment in the event of a slowdown, and yet be capable of maintaining fairness by satisfying the memory requests of the other network segments.

In accordance with yet another important aspect of the invention, packets received by the lower level network interfaces are first briefly examined by the intermediate network driver 120 of the present invention to determine if the received packets require processing by the computing device 20 hosting the software bridge or whether they should be retransmitted on another network segment. If the packets do not require processing, they can be ignored, increasing the efficiency of the bridge. If the packets require processing, they can be placed on a queue to be processed. Packets addressed to a destination other than computing device 20, and which do not require to be transferred from one network segment to another by the bridge, do not require any processing by the computing device 20 and can be ignored. If the intermediate driver 120 were to simply process each packet as it arrives, some packets, such as those that do not require any processing by the host computing device 20 or the intermediate driver 120, would be dealt with very quickly, while packets which required significant processing would consume a lot of time. Because of this variance in the amount of time between receipt of a packet by the network interface and the restoration of control to the network interface so that it can receive a new packet, the network can experience uneven transmission rates, decreasing the efficiency of the network. By preliminarily examining the incoming packets, and queuing those which require processing, control can be more predictably returned to the network interface to receive additional packets. Because the length of time during which the network interface does not have control is relatively constant, the network can maintain a consistent rate of transfer, increasing the efficiency of the network. Furthermore, by queuing the packets which require processing, the processing can occur at more convenient moments, and provide additional efficiencies, which will be explained further below.

In accordance with a further important aspect of the invention, a user interface to the functionality of the intermediate driver 120 and lower level network components can be provided. One exemplary user interface is shown in FIGS. 8*a* through 8*d*. The exemplary user interface provides access to the intermediate network driver's abilities to bridge two or more individual network segments together, as shown in FIG. 8*b*. Once the individual network segments are bridged, the exemplary user interface can present the bridged network to the user as a single interface point, as shown in FIG. 8*c*. The user is, therefore, presented with a single bridged network just as the higher level networking software is presented with a single bridged network interface by the intermediate network driver 120. The exemplary user interface can also allow the user to change the properties, both of the bridged network as a unit, and of individual network segments, as shown in FIG. 8*d*. To avoid undermining the efforts to present the bridged network to higher level networking software as a single interface, the exemplary user interface should not allow the user to modify the properties of an individual network segment that is part of the bridged network. The exemplary user interface will be described in more detail below, with reference to FIGS. 8*a* through 8*d*.

In keeping with the invention, a software network bridge can be implemented on a host computing device to interconnect one or more network segments such that devices on each network segment can access other devices and share peripherals on any other network segment. The software bridge can also abstract the bridged network segments such that they appear to the host computing device to be a single network segment. As is known by those skilled in the art, a network bridge, implemented either in software or hardware, interconnects network segments by examining the destination of each transmitted packet of information and forwarding the packet to the network segment through which it can reach its intended destination. Turning to FIG. 2, desktop computer 65 can send information to the portable computer 63 by specifying, as part of the transmitted packet, the address of the portable computer 63, such a Media Access Control (MAC) address in an Ethernet environment. The software bridge of the current invention can examine the packet to determine if it needs to be transferred between network segment 100 and network segment 102. As will be described below, the software bridge maintains a database of known addresses and the connections through which those addresses can be reached. Thus, upon receiving the packet containing the address of the portable 63, the software bridge can determine, with reference to the database, that the portable 63 can be reached through the network segment 102. The bridge can then forward the received packet to the portable 63 through network segment 102. As a result of the bridge's functionality, the portable computer 63 appears to the desktop 65 to be on the same network as the desktop.

The software bridge of the present invention can be implemented as the intermediate network driver 120 of FIG. 3. However, as will be understood by those of skill in the art, the software bridge of the present invention is not limited to bridging only two network segments. Thus, while the implementation of the software bridge shown in FIG. 3 contains only two ports 124 and 125, the descriptions below contemplate a software bridge without limit to the number of ports or the number of network segments bridged together. Each of the ports 124 and 125 of the intermediate network driver 120 are connected to individual network segments through network interfaces, such as the wire-based NIC 53 and its corresponding driver 61 and the wireless NIC 54 and its corresponding driver 62. Therefore, as will be explained in more detail below, when the intermediate network driver 120 sends a packet through a given port, it passes it to the network interface connected to that port, which, in turn, transmits the packet across the network segment to which that network interface is connected. Similarly, packets from a network segment are received by the network interface and indicated to the intermediate network driver through the port to which the network interface is attached.

The software bridge of the present invention, implemented as intermediate network driver 120, creates and maintains a database mapping the network addresses of computers on the network to the port through which that network address can be reached. When the ports 124 and 125 are either in a "learning" or "forwarding" state, which will be described in more detail below, the software bridge examines the source address of every packet that is received through ports 124 and 125. The software bridge then enters into the database the source address and the port at which messages from this address were detected. Addresses which do not correspond to an individual computer, but are instead broadcast or multicast addresses, are not included in the database.

Should the bridge need to forward a packet to an address, it can look up the address in the database, and will send the packet out through the same port that messages from the address were detected. Because the network topology may change unexpectedly as devices get plugged into and unplugged from the network, the entries in the database can be continuously updated. Thus, if the bridge detects packets with a given source address on a different port, it can modify the database to reflect the perceived change in topology. Similarly, it is possible that the computer corresponding to the detected address becomes disconnected. To accommodate for such a situation, the bridge can also set a timer or "expiration date" for each entry in the database, such that entries which have not been updated or verified for a particular length of time are discarded.

The software bridge of the present invention can receive data from the multiple network segments 100 and 102 and forward the data through the appropriate network interface so that it reaches its indicated destination or destinations. When a data packet is received at a network interface and given to the software bridge, the bridge can determine the destination address of the packet. Addresses corresponding to individual computers can be referenced in the forwarding database, and the packet can be sent out by the bridge through the port indicated in the database. If there is no entry in the database corresponding to the destination address, the software bridge can send the packet out to all of the bridged network segments. While such data packet "flooding" is inefficient, it often delivers the packet to the intended recipient, who generally responds. Once the bridge detects the response at a particular port, an entry will be added to the forwarding database, and future communications to that recipient will not need to be flooded. Data packets whose indicated destination is not an individual computer, such as broadcast or multicast packets, can always be flooded, since every device on the network could be interested in receiving such packets.

Because the network segment interfaces, such as NICs 53 and 54, detect every packet on their respective network segments, there may be packets delivered to the intermediate driver 120 which do not require any processing on the part of the intermediate driver. As is known by those skilled in the art, devices on an individual network segment communicate by transmitting a packet through the physical connection of the network segment. Because each device on the network segment has an interface detecting signals on the physical connection, each packet sent by every device is detected by every other device. Those packets not addressed for a given device, however, are simply ignored by that device. Similarly, the software bridge of the present invention does not need to process packets from a device on one network segment to another device on the same segment. Such packets will be detected by the intended recipient without intervention by the bridge. The forwarding database can be consulted only for those packets destined for computers on network segments other than the segment of the sending computer. In one preferred embodiment, the software bridge of the present invention operates in an Ethernet network. As is known by those skilled in the art, Ethernet packets contain the MAC address of the sending computer and the destination MAC address.

Thus, the forwarding database contains entries corresponding a given MAC address to a port number through which the bridge can send packets destined for the given MAC address. The forwarding database can be implemented as a hash table with singly-linked lists of entries for each hash bucket. An exemplary structure used for the forwarding database can be as follows:

```
typedef struct _MAC_FWDTABLE_ENTRY
{
    HASH_TABLE_ENTRY        hte;
    PADAPT                  pAdapt;
} MAC_FWDTABLE_ENTRY, *PMAC_FWDTABLE_ENTRY
```

An exemplary HASH_TABLE_ENTRY structure used with the forwarding database structure above, can be as follows:

```
typedef struct _HASH_TABLE_ENTRY
{
    struct _HASH_TABLE_ENTRY  *Next;
    ULONG                     LastSeen;      // Result of
                                             // NdisGetSystemUpTime( )
    UCHAR                     key[MAX_SUPPORTED_KEYSIZE];  // User's data
                                                           // follows
} HASH_TABLE_ENTRY, *PHASH_TABLE_ENTRY;
```

Each MAC_FWDTABLE_ENTRY structure holds the MAC address of a computer, stored in the hte.key field, and a pointer to the network interface on the which the address was noted (pAdapt). The HASH_TABLE_ENTRY structure also has an entry (LastSeen) which is updated every time the MAC address stored in the structure is noted. This facilitates the removal of information from the database which may be too old to be accurate. In one preferred embodiment, information which is has not been entered or updated within the last 300 seconds is removed by a timer function which runs every 15 seconds.

The pointer to the network interface (pAdapt) mentioned above, is a pointer to a data structure which contains information regarding a particular network interface. An exemplary structure used to store network interface information by the software bridge can be as follows:

```
typedef stuct _ADAPT ADAPT, *PADAPT;
typedef struct _ADAPT
{
    PADAPT           Next;        // Next adapter in queue
    LONG             AdaptSize;   // Size of structure
                                  // (storage for DeviceName is at tail)
    WAIT_REFCOUNT    Refcount;    // Refcount for the adapter
    // State must be updated inside a write lock on
    // gAdapterCharacteristicsLock, since an adapter's relaying status
    // affects our miniport's virtual status.
    // Only the STA code writes to this field; all other code should
    // treat it as read-only.
    PORT_STATE              State;
    //
    // Various useful info about the adapter. None of these fields are
    // ever changed after adapter initialization.
    //
    NDIS_STRING   DeviceName;
    NDIS_STRING   DeviceDesc;
    UCHAR         MACAddr [ETH_LENGTH_OF_ADDRESS];
    NDIS_MEDIUM   PhysicalMedium;          // Set to NO_MEDIUM if
                                           // the NIC doesn't report
                                           // something more specific
    NDIS_HANDLE   BindingHandle;
    BOOLEAN       bCompatibilityMode;      // TRUE if the adapter
                                           // is in compatibility mode
    // These two fields are used while opening / closing an adapter
    NDIS_EVENT    Event;
    NDIS_STATUS   Status;
    // This field is volatile
    BOOLEAN       bResetting;
    // The queue and bServiceInProgress is protected by this spin lock
```

-continued

```
NDIS_SPIN_LOCK      QueueLock;
BSINGLE_LIST_HEAD   Queue;
BOOLEAN             bServiceInProgress;
// This allows a caller to wait on the queue becoming empty. It is
// updated when an item is queued or dequeued.
WAIT_REFCOUNT       QueueRefcount;
// Auto-clearing event to request servicing of the queue
KEVENT              QueueEvent;
// These fields are locked by gAdapterCharacteristicsLock for all
// adapters together
ULONG               MediaState;     // NdisMediaStateConnected and
                                    // NdisMediaStateDisconnected
ULONG               LinkSpeed;      // Units of 100bps
                                    // (10MBps == 100,000)
// This structure is locked by gQuotaLock for all adapters together
ADAPTER_QUOTA Quota;        // Quota information for this adapter
// Statistics
LARGE_INTEGER       SentFrames;     // All frames sent (including relay)
LARGE_INTEGER       SentBytes;      // All bytes sent (including relay)
LARGE_INTEGER       SentLocalFrames; // Frames sent from the local
                                    // machine
LARGE_INTEGER       SentLocalBytes; // Bytes sent from the local machine
LARGE_INTEGER       ReceivedFrames; // All received frames
                                    // (including relay)
LARGE_INTEGER       ReceivedBytes;  // All received bytes
                                    // (including relay)
STA_ADAPT_INFO STAInfo;             // STA data for this adapter
// Set once from FALSE to TRUE when STA initialization on this
// adapter has completed. This flag is set inside the gSTALock.
BOOLEAN             bSTAInited;
} ADAPT, *PADAPT;
```

Using the ADAPT structure illustrated above, the software bridge can store information regarding the network interfaces it bridges in a liked list. Therefore, Next is a pointer to another ADAPT structure containing the information of the next interface in the list. The number AdaptSize indicates the size of the ADAPT structure, which can vary because, in one embodiment, storage for the device's name and description can be allocated in the same block as the ADAPT structure itself. The WAIT_REFCOUNT structure indicates the number of separate active references to the ADAPT structure (Refcount) and allows code to wait for the Refcount to reach zero. The PORT_STATE structure contains the current state of the interface. An interface can be set to a number of states, such as the Blocking, Listening, Learning, and Forwarding states for those interfaces complying with the Spanning Tree Algorithm, as described in detail below. The DeviceName and DeviceDesc are merely the name and description of the interface. The interface's Ethernet MAC address can be stored in MACAddr[ETH_LENGTH_OF_ADDRESS], the nature of the physical medium used by the adapter can be stored in PhysicalMedium, the maximum throughput of the adapater can be stored in LinkSpeed, and an indication of whether the adapter is "plugged in" can be stored in Media-State. BindingHandle stores a handle to be used when referring to the adapter, and the Boolean variable bCompatibilityMode indicates whether the adapter is being operated in the compatibility mode. An NDIS_EVENT structure can indicate the completion of the opening or closing of the adapter, and the NDIS_STATUS structure can indicate the status of the open or close attempt when it has completed. A Boolean, bResetting, indicates whether the adapter is resetting. Queue is the head of a singly-linked list of packets received on this adapter that are waiting to be processed, QueueRefcount is the number of packets waiting to be processed, and the Boolean bServiceInProgress indicates whether the list of packets is currently being serviced. An NDIS_SPIN_LOCK structure protects the Queue and bServiceInProgress fields, and QueueEvent is a synchronization event used to signal that this adapter's packet queue is currently being serviced. The adapter's memory usage can be tracked using the ADAPTER_QUOTA structure, and the number of frames and bytes that the adapter has sent or received can be tracked with the integers SentLocalFrames, SentLocalBytes, ReceivedFrames, and ReceivedBytes, respectively. As described in detail below, if the adapter is being used to conform with the Spanning Tree Algorithm, STAInfo can store the Spanning Tree Algorithm state of the adapter, and the Boolean bSTAInited can indicate whether the Spanning Tree Algorithm has initialized the adapter.

Figure 5:
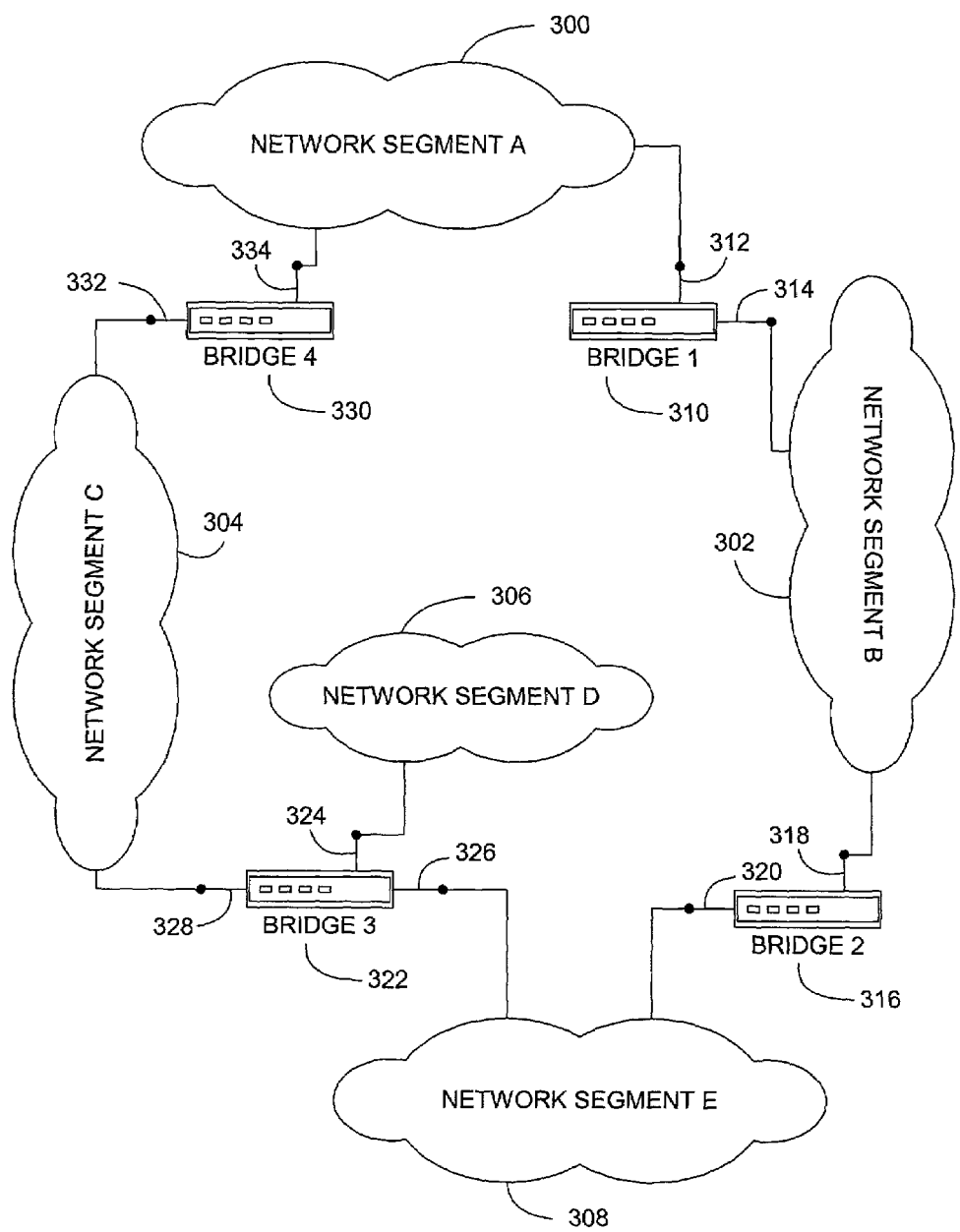
FIG. 5 is a block diagram generally illustrating a circular network topology in which the present invention can be used.

As mentioned above, the software bridge of the present invention can conform with the Spanning Tree Algorithm (STA) as described in IEEE document 802. 1D, 1993 edition, entitled "Information Technology—Telecommunications and Information Exchange Between Systems—Local Area Networks—Media Access Control (MAC) Bridges" published in 1993 and incorporated herein by reference in its entirety. The STA can prevent bridges from forwarding packets endlessly in networks whose physical topology contains loops. The operation of the STA can be illustrated using a more complicated network setup, such as that shown in FIG. 5. FIG. 5 contains multiple network segments, 300, 302, 304, 306, and 308 labeled network segments A through E, respectively, which are interconnected by network bridges 310, 316, 322, and 330. As can be seen, network segments 300, 302, 308, and 304, together with bridges 310, 316, 322, and 330 form a circular loop. Consider a broadcast packet originating from a computer on network segment 300. Without the STA, such a packet would be forwarded by bridges 310 and 330 to network segments 302 and 304. The same packet would subsequently be forwarded to the computers in network segment 308 by bridge 332 and then again by bridge 316, resulting in duplicate packets being received by the network segment 308. Network segment 306 would only receive one copy initially from bridge 322. The packet from bridge 316 would pass through network segment 308 and subsequently be forwarded by bridge 332 to network segment 304 and 306, and the packet from bridge 332 would pass through network segment 308 and subsequently be forwarded by bridge 316 to network segment 302. Without the STA, the circular topology of the network in FIG. 5 would not only result in the same packet continually forwarded around in a loop, but also results in endless copies of the packet being delivered to each computer in the loop.

The Spanning Tree Algorithm can avoid such looping problems by selectively blocking certain ports of the network bridges. As is known by those skilled in the art, each bridge has a unique identifier, often based on the lowest number address of one of the bridge's interfaces to the bridged network segments. The bridge with the lowest identifier is known as the "root bridge". The port of every other bridge in the network through which packets are most efficiently sent to the root bridge is known as the "root port". Thus, turning to FIG. 5, if bridge 310 is the root bridge, then port 318 on bridge 316 is the root port of bridge 316. It offers the most direct route to the root bridge since packets must only pass through network segment 302 before reaching the root bridge.

Alternatively, port 320 is not the root port, as packets would have to pass through network segments 308, 304, and 300, and bridges 322 and 330 prior to reaching the root port. Similarly port 326 of bridge 322 and port 334 of bridge 330 are also root ports of those bridges. Bridge 310, because it is the root bridge, does not contain a root port. Under the STA, root ports are allowed to receive and send data; they are not blocked.

On any given network segment, one of the bridges connected to that segment is selected to forward packets through its root port to the root bridge. Such a bridge is called the "designated bridge" for the particular network segment. The port of the designated bridge connecting it to the particular network segment, for which the bridge is forwarding packets to the root bridge, is the "designated port". The designated port is the port through which the network segment sends communications to the root bridge. For example, both ports 312 and 314 of the root bridge are designated ports, as they are the ports through which network segments 300 and 302, respectively, send packets to the root bridge 310. Network segment 306 can only send packets to the root bridge through port 324 of bridge 322, thus port 324 is the designated port for network segment 306. Similarly, network segment 308 can most efficiently forward packets to the root bridge through port 320 of bridge 322, making port 320 the designated port for network segment 308. Like root ports, designated ports are allowed to send and receive data and are not blocked.

To succeed in preventing continuous packet forwarding in circular network topologies, the STA requires that all ports of all of the bridges which are not either root ports or designated ports, are to be blocked. Thus any port which is neither a root nor a designated port will not be allowed to transmit data, nor will it be allowed to receive data, except for STA packets, which will be described in more detail below. Returning to FIG. 5, ports 318, 328, and 334 are root ports, as described above, and are not blocked. Ports 312, 314, 320, 324, and 332 are designated ports, as described above, and are also not blocked. However, port 326 is neither a designated port nor a root port, and thus, under the STA, it is blocked. The effect of blocking port 326 or bridge 322 can be seen by re-analyzing the situation described above where a computer in network segment 300 sent a broadcast packet. The packet would be forwarded to network segment 302 through port 314 of bridge 310 and to network segment 304 through port 332 of bridge 330. Subsequently the packet would be forwarded to network segment 306 by port 324 of bridge 322 and to network segment 308 by port 320 of bridge 316. However, unlike the situation described above without the implementation of the STA, the packet would not be forwarded a second time to network segment 308 by bridge 322, because port 326 is neither a root port nor a designated port, and cannot forward packets. Similarly, the packet from network segment 308 will not be circulated to network segments 304 and 306 again because port 326, as it is in a blocking state, will not receive the packet from network segment 308. Therefore, the implementation of the STA ensured that each network segment received the packet only once, and that, despite the circular physical topology, the packet was not endlessly forwarded around the network.

To determine which bridge is the root bridge, and which ports are the root ports and designated ports, the bridges implementing the STA occasionally send their own data through the network, known as STA packets. When a bridge is first added to the network, it can assume that it is the root bridge. Upon receiving an STA packet, the bridge will compare its bridge identifier to the bridge identifier of the bridge sending the STA packet. If the sending bridge's identifier is lower, the bridge receiving it can internally store the identifier of the sending bridge as the root bridge. Because bridges periodically send STA packets, eventually each bridge in the network can contain the identifier of the same bridge as the root bridge. Generally, to minimize the number of STA packets occupying bandwidth on the network, only bridges believing themselves to be root bridges sent STA packets. Bridges which have the identifier of a different bridge listed as the root bridge merely forward STA packets, and increment the distance-to-root field of the packet. In this manner, the STA packets can not only be used to identify the root bridge, but they also inform bridges of the distance to the root bridge.

Each bridge, which is not the root bridge, can keep track of which port offers the shortest distance to the root bridge. As explained above, this is the root port. For all of the other ports of the bridge, the bridge can monitor the STA packets to determine if there is another bridge connected to the same network segment which offers a lower distance-to-root. If there is no such bridge, then the port connected to that network segment becomes the designated port for that network segment. Each port of a bridge which is determined to be either a root port or a designated port is kept in the forwarding state and is allowed to receive and send data across the network segments. Every other port of the bridge is kept in the blocking state, and is not allowed to send or receive data, except for the receipt of STA packets, which can always be allowed.

Under the STA, the ports of a bridge can be in one of a number of states. Four main states that can be defined are the blocking state, the listening state, the learning state, and the forwarding state. As described above, the blocking state does not forward any packets and inbound packets are blocked, except for STA packets, which are let through. The listening state can be identical to the blocking state, except that it is a transitory state, as the bridge accommodates changes in the network. In the learning state, inbound packets are examined, and the forwarding database is updated as described above. However, no packets are forwarded except for STA packets. After a sufficient forwarding table has been created the port can enter the forwarding state which, as described above, receives and sends packets. The forwarding table can continue to be updated when a port is in the forwarding state as well.

In addition to providing the services of a network bridge in software, the present invention can also abstract the interconnected network segments as a single network connection to the host computer, as was briefly described above. Returning to FIG. 3, the wire-based NIC 53 and the wireless NIC 54 of FIG. 1 are shown at the bottom of a network layer diagram illustrating the networking software on the bridge host computing device 20. Each NIC has its respective NIC driver 61 and 62, also shown in FIG. 3. The bridging functions of the software bridge of the present invention can be implemented by the intermediate network driver 120 as described in detail above. The intermediate driver 120 can also expose a single higher level network interface 122 to higher level networking software, including higher level applications and protocols, such as application program 36 and other program modules 37. By exposing only a single higher level interface 122, the intermediate driver 120 can allow the higher level applications and protocols to interact with wire-based network segment 100 and wireless network segment 102 as if the computers and peripherals on those segments were on the same segment.

Packets being sent by higher level networking software, including higher level applications or protocols on computing device 20 can be delivered to higher level interface 122 of the intermediate network driver 120. The intermediate driver can then determine whether the packet is directed to a single address, or whether it is a multicast or broadcast packet. If the packet is directed to a single address, the intermediate driver 120 can reference the forwarding database, described in detail above, to determine the appropriate port through which to send the packet such that it most efficiently reaches its intended destination. For example, if the packet sent by application program 36 was directed to desktop computer 65, then the intermediate driver 120 would send the packet through port 124 to the wire-based NIC driver 61, since port 124 is connected, through the wire-based NIC 53, to the network segment containing desktop computer 65, namely the wire-based network segment 100 of FIG. 2. However, if the packets sent by higher level applications or protocols are to be broadcast, the intermediate driver 120 can simultaneously send the packets to all of the bridged network segments without creating multiple copies of the packet, as will be described in further detail below. For example, a broadcast packet could be sent, by the intermediate driver 120, through ports 124 and 125 simultaneously.

The software bridge of the present invention, implemented as intermediate network driver 120, can also receive packets directed to host computing device 20 through either network segments 100 or 102. When a packet is received by a network segment interface, it is delivered to the intermediate driver 120 through a port by the network interface driver. The intermediate driver 120 can then determine whether the packet is addressed to the host computing device 20, to another device, or whether it is a broadcast or multicast packet. If the packet is addressed to another computer, it can be sent to that computer by being forwarded out through the port indicated in the forwarding database. Alternatively, the packet may be addressed to another computer on the same network segment as the sending computer. In such a case the intermediate driver does not need to forward the packet. However, packets directed to the host computing device 20 can be delivered to higher level applications or protocols, to perform further decoding of the packet, through higher level interface 122. Similarly, multicast or broadcast packets can be delivered to the higher level applications or protocols on the host computing device 20, in additional to being forwarded to all of the other network segments.

In one preferred embodiment, the software bridge of the present invention can be implemented in a Microsoft WINDOWS brand operating system environment, networked to an Ethernet network. The software bridge can be implemented as a Network Device Interface Specification (NDIS) Intermediate Driver. As is known by those skilled in the art, NDIS provides a specification for the implementation of network drivers. A driver is said to be an NDIS driver if it can accept requests and create responses and requests of its own which conform with the NDIS interfaces. NDIS defines a number of characteristics which can be defined and queried. The NDIS intermediate driver implementing the software bridge of the present invention can respond to NDIS requests from higher level applications and protocols. Because the intermediate driver abstracts multiple underlying network interfaces, its responses to NDIS requests need not pass through the details of each underlying interface, but can represent a request specific conglomeration of the details of each interface such that the higher level applications and protocols only perceive the single interface being exposed by the present invention. For example, a higher level application can query a lower level driver for the speed of the link being maintained by the interface through the use of an NDIS_REQUEST structure in which the Object IDentifier (OID) of the operation is OID_GEN_LINK_SPEED. If the intermediate driver of the present invention receives an OID_GEN_LINK_SPEED request, it can perform the same request to each of the underlying lower level network interface drivers. Once each driver has responded, the intermediate driver can respond to the original request with the maximum link speed reported by any of the lower level network interface drivers. Alternatively, the intermediate driver 120 can receive the maximum link speed from each lower level network interface driver when the intermediate network driver 120 initializes its connection to the lower level network interface driver. In such a situation, the intermediate driver 120 can respond to OID_GEN_LINK_SPEED by itself, without the need to query the lower level drivers. Because protocols such as the Transmission Control Protocol/Internet Protocol (TCP/IP) can more easily decrease their transmission speeds rather than increase them, the present invention conglomerates the information from the underlying drivers, in this situation, by providing the maximum link speed reported by any of the underlying drivers. This allows those drivers which, in fact, support the maximum link speed provided by the intermediate driver to operate at their peak while those drivers whose maximum link speed is, in fact, less than that provided will simply appear to the higher level protocols as operating at less than the maximum possible speed.

Determining the link speed is only one of a number of NDIS requests which can be made of the intermediate driver. Table 1 below lists a number of NIDS query request OIDs and a preferred response from the software bridge implemented as an intermediate NDIS driver. Similarly, Table 2 below lists a number of NDIS query request OIDs which are specific to Ethernet drivers. As was stated above, in one preferred embodiment, the software bridge of the present invention operates in an Ethernet network. Thus, Table 2 also provides preferred responses from the software bridge.

TABLE 1

| Characteristic name | Bridge response |
| --- | --- |
| OID_GEN_SUPPORTED_LIST<br>List of supported OIDs | All OIDs listed in this table |
| OID_GEN_HARDWARE_STATUS<br>Hardware status | NdisHardwareStatusReady |
| OID_GEN_MEDIA_SUPPORTED<br>Media types supported (encoded) | NdisMedium802_3 only |
| OID_GEN_MEDIA_IN_USE<br>Media types in use (encoded) | NdisMedium802_3 only |
| OID_GEN_MAXIMUM_LOOKAHEAD<br>Maximum in bytes, receive lookahead size | = OID_GEN_RECEIVE_BLOCK_SIZE (the bridge driver always provides the full packet to higher-level drivers) |
| OID_GEN_MAXIMUM_FRAME_SIZE<br>Maximum in bytes, frame size | 1500 bytes (this OID is specified to not include the size of frame headers) |
| OID_GEN_LINK_SPEED<br>Link speed in units of 100 bps | Maximum link speed reported by any bound NIC driver |
| OID_GEN_TRANSMIT_BUFFER_SPACE<br>Transmit buffer space | 15K (reported as a number of bytes). This is a typical value for an Ethernet NIC. |
| OID_GEN_RECEIVE_BUFFER_SPACE<br>Receive buffer space | 150K (reported as a number of bytes). This is a typical value for an Ethernet NIC. |
| OID_GEN_TRANSMIT_BLOCK_SIZE<br>Minimum amount of storage, in bytes, that a single packet occupies in the transmit buffer space of the NIC | 1514 (the maximum Ethernet frame size) |
| OID_GEN_RECEIVE_BLOCK_SIZE<br>Amount of storage, in bytes, that a single packet occupies in the receive buffer space of the NIC | 1514 (the maximum Ethernet frame size) |
| OID_GEN_VENDOR_ID<br>Vendor NIC code | 0xFFFFFF (No IEEE-registered vendor code) |
| OID_GEN_VENDOR_DESCRIPTION<br>Vendor network card description | "Microsoft MAC Bridge Virtual NIC" |
| OID_GEN_VENDOR_DRIVER_VERSION<br>Vendor-assigned version number of the driver | MAC Bridge driver version number (currently 1.0) |
| OID_GEN_CURRENT_PACKET_FILTER<br>Current packet filter (encoded) | Current value of the packet filter for this binding |
| OID_GEN_CURRENT_LOOKAHEAD<br>Current lookahead size in bytes | 1514 (the maximum Ethernet frame size) |
| OID_GEN_DRIVER_VERSION<br>NDIS version number used by the driver | NDIS version in use by bridge NIC (currently 5.0) |
| OID_GEN_MAXIMUM_TOTAL_SIZE<br>Maximum total packet length in bytes | 1514 (the maximum Ethernet frame size) |
| OID_GEN_MAC_OPTIONS<br>Optional NIC flags (encoded) | NDIS_MAC_OPTION_NO_LOOPBACK only (the bridge driver does not handle loopbacks internally) |
| OID_GEN_MEDIA_CONNECT_STATUS<br>Whether the NIC is connected to the network | NdisMediaStateConnected if at least one NIC is in this state; NdisMediaStateDisconnected if all NICs are in that state. |
| OID_GEN_MAXIMUM_SEND_PACKETS<br>The maximum number of send packets the driver can accept per call to its MiniportSendPackets function | A large number (currently 0xFF) |
| OID_GEN_SUPPORTED_GUIDS<br>The custom GUIDs (Globally Unique Identifier) supported by the miniport | Not supported (no reply) |
| OID_GEN_PHYSICAL_MEDIUM<br>Physical media supported by the miniport (encoded) | Not supported (no reply) |

TABLE 2

| Characteristic name | Bridge response |
| --- | --- |
| OID_802_3_PERMANENT_ADDRESS<br>Permanent station address | The bridge builds the MAC address it is to use by setting the "locally administered" bit in the MAC address of the first NIC to which it binds |
| OID_802_3_CURRENT_ADDRESS<br>Current station address | Same as OID_802_3_PERMANENT_ADDRESS. |
| OID_802_3_MULTICAST_LIST<br>Current multicast address list | Query: Bridge returns the current multicast list<br>Set: Bridge driver records requested multicast addresses |
| OID_802_3_MAXIMUM_LIST_SIZE<br>Maximum size of multicast address list | A large value (currently 0x0000000F) |
| OID_802_3_MAC_OPTIONS<br>NIC flags (encoded) | Not supported (no reply) |

In addition to defining properties which can be queried, NDIS also defines operational characteristics which can be set by higher level drivers, applications, and protocols. For example, an NDIS_REQUEST structure specifying an OID of OID_GEN_CURRENT_PACKET_FILTER can be used to set the packet filtering settings of an NDIS driver. A packet filter, as is known by those of skill in the art, can specify to a driver which type of packets are to be indicated to higher level software and which types of packets are to be ignored. For example, higher-level protocol components may or may not be interested in receiving broadcast or multicast network frames. By setting the intermediate driver's packet filter, higher-level protocols can control whether or not they receive broadcast or multicast frames. The intermediate driver implementing the software bridge of the present invention can receive the NDIS request specifying packet filtering through OID_GEN_CURRENT_PACKET_FILTER and store the requests in an internal reference to determine which packets to indicate to the higher level protocols. Thus, the software bridge can operate the lower level network interface drivers in "promiscuous" relay mode, where every packet that is received by the network interface is relayed by the driver to the software bridge. The software bridge can then compare the packets addressed to the host PC to the internal filtering reference to determine if the packet should be relayed to the higher level applications, or should be ignored. Table 3 below lists additional NDIS set request OIDs and a preferred response from the software bridge implemented as an intermediate NDIS driver.

TABLE 3

| Characteristic name | Bridge action |
| --- | --- |
| OID_GEN_CURRENT_PACKET_FILTER<br>Current packet filter (encoded) | Records specified filter setting |
| OID_GEN_CURRENT_LOOKAHEAD<br>Current lookahead size in bytes | Accepted but without effect |
| OID_GEN_PROTOCOL_OPTIONS<br>Optional protocol flags (encoded) | Accepted but without effect |
| OID_GEN_NETWORK_LAYER_ADDRESSES<br>List of network-layer addresses associated with the binding between a transport and the driver | Passed through to each underlying NIC |
| OID_GEN_TRANSPORT_HEADER_OFFSET<br>Size of packets' additional header | Passed through to each underlying NIC |

The software bridge of the present invention can relay packets from one network segment to another, or can provide those packets to the host computer. Often, a packet received on one network interface may need to be sent out to multiple different network interfaces, or may need to be sent to a different network interface, and provided to the host computer. The software bridge of the present invention provides for performing such multiple transmissions in parallel, to increase the efficiency of the network system.

Turning to FIGS. 2 and 3, the application program 36 on the host computing device 20 may seek to send a broadcast packet to every computer in the virtual LAN 51 (comprised of wireless network segment 102 and wire-based network segment 100). Such a packet would be provided to the software bridge of the present invention, implemented as intermediate network driver 120, by a higher level application such as application program 36. The intermediate network driver 120 can then, in turn, provide the packet to all of the underlying network interfaces, namely the wire-based NIC driver 61 and the wireless NIC driver 62. The drivers 61 and 62 can then send the packet through the wire-based NIC 53 and wireless NIC 54, respectively to network segments 100 and 102.

As is known by those skilled in the art, packets are sent across a network by providing a NIC driver with access to a location in memory where the data of the packet resides. The driver can then incrementally read the data from the location in memory and instruct the NIC to place the appropriate signals onto the network medium. Another NIC at the receiving end will decode the signals sensed on the network medium and inform the NIC driver, which can then store the received data into a receive buffer. It must be the case that the memory locations which contain the packet data are not modified prior to the completion of the transmission by the network interface driver. Once the driver has completed sending the packet across the network, it returns control of the memory locations to the sending software so that the memory locations may be reused as needed.

The intermediate driver 120 contemplated by the present invention can allow multiple underlying network interfaces to send a packet in parallel, without the need to copy the packet. Rather than making a complete copy of the data of the broadcast packet, the present invention contemplates the creation of multiple packet descriptors which merely point to the data of the packet. The intermediate driver 120 can then provide a packet descriptor to driver 61 and another packet descriptor to driver 62 and allow the drivers to send the data in parallel. In such a manner, each driver can release its packet descriptor when it has completed sending the packet data stored in the buffers pointed to by the pointers of the packet descriptor, and the intermediate driver 120 can avoid duplicating the data stored in the buffers, thereby saving memory.

Turning to FIG. 4, the broadcast packet above is shown as packet 231, which is structured so that the data of the packet is stored in buffers 221, 223, and 225. The packet 231 is defined by a packet descriptor 232 containing descriptors 233, 235, and 237 which point to locations in memory 221, 223, and 225 respectively. As is understood by those skilled in the art, the packet 231 is the data which is to be transmitted across the network and which is contained within the buffers 221, 223, and 225. However, since buffers 221, 223, and 225 are often not contiguous, and can be quite large, the data which comprises the packet 231 can be more easily identified and controlled through the use of a packet descriptor 232, which contains, in addition to other information about the packet, pointers to the memory locations in which the data of the packet is stored. The packet descriptor 232 can be thought of as the deed to the packet 231, which is composed of the data stored in memory locations 221, 223, and 225. Whichever network unit retains the packet descriptor 232 by definition also has the packet 231.

The broadcast packet 231 was provided to the intermediate network driver 120 from the application program 36 by passing down the packet descriptor 232. The intermediate driver 120 can examine packet 231 and determine the appropriate destination of the packet. Once it has determined the appropriate destination, the intermediate driver 120 can determines the number of interfaces through which the packet must be sent. Thus, if the application program 36 delivered a broadcast packet to the intermediate network driver 120, the intermediate driver would determine that the packet needs to be sent through two network interfaces, namely the wire-based NIC 53 and the wireless NIC 54. Once the number of interfaces are determined, the intermediate driver 120 can create the appropriate number of packet descriptors such that each interface can be granted control of a packet and can send the data simultaneously. For the layout illustrated in FIG. 3, two packet descriptors that can be passed to the two interfaces 53 and 54 are required.

As is known by those skilled in the art, when a higher level application seeks to transmit a packet across the network, the application grants control of the packet to the underlying network driver. Thus, in FIG. 4, control over original packet 231 was provided to the intermediate driver 120 from the application program 36 by passing to the intermediate driver the packet descriptor 232. Once the packet has been sent, intermediate driver 120 can return control of packet 231 to application 36 by returning the packet descriptor 232. Since packet descriptor 232 will be returned to the application 36, the intermediate driver 120 can avoid modifying the packet descriptor by creating a new base packet 201 and a corresponding a new packet descriptor 202. As shown in FIG. 4, the base packet descriptor 202 can contain descriptors 205, 207 and 209, which point to the same memory locations 221, 223, and 225 as do the descriptors 233, 235, and 237 of the original packet descriptor 232. Thus, the base packet 201 is the same as the original packet 231. However, because base packet descriptor 202 only contains pointers to the data buffers, the creation of the base packet 201 only required a minimal amount of memory, namely the memory necessary to hold base packet descriptor 202. Had the intermediate network driver sought to create a duplicate packet by copying the data in buffers 221, 223, and 225, the resulting memory consumption would be much greater. Furthermore, because the base packet descriptor 202 was created and internally maintained by the intermediate driver 120, the base packet descriptor can contain additional information. In addition to the pointers, the base packet descriptor 202 also contains a pointer 204 back to the original packet 231, and a counter 203 which tracks the number of child packets pointing to the base packet.

Because the intermediate driver 120 will transmit the broadcast packet to two network interfaces, a second copy of the original packet 231 is needed to perform the send in parallel. Thus, a child packet 211 is also created by the intermediate driver 120 by creating another packet descriptor 212 containing pointers 215, 217, and 219 to memory locations 221, 223, and 225. As before, because the pointers 215, 217, and 219 of the child packet descriptor 212 point to the same memory locations 221, 223, and 225 as the pointers 233, 235, and 237 of the original packet descriptor 232, the child packet 212 is the same as the original packet 231.

Similarly, like the creation of the base packet 201, described above, the creation of child packet 212 did not consume a lot of memory, as the data of the packet, contained in buffers 221, 223, and 225, was not itself copied. The only memory used was that required to hold the child packet descriptor 212. In addition to the pointers to the data buffers, the child packet descriptor 212 also contains a pointer 213 to the base packet 201. When the intermediate driver creates the child packet 211, it can increment the counter 203 of the base packet descriptor 202.

To send the broadcast packet simultaneously through both the wireless NIC 54 and the wire-based NIC 53, the intermediate driver 120 can send the child packet 211 to the wireless NIC driver 62 and the base packet 201 to the wire-based NIC driver 61 by providing to driver 62 the child packet descriptor 212 and providing to driver 61 the base packet descriptor 202. Each driver will, in a manner known to those skilled in the art, instruct the underlying NIC to send the data contained within the memory locations pointed to by the packet descriptors 212 and 202, respectively.

When each driver has completed sending the packet provided to it, it can return the packet descriptor to the intermediate driver 120, signaling that it has completed sending the packet. The intermediate driver 120, however, can monitor the counter 203 of the base packet descriptor 202 to determine if all of the network interfaces have completed the transmission. Only after all of the interfaces have completed their transmissions would it be appropriate for the intermediate driver 120 to return the original packet 231 to the application program 36. Should the intermediate driver return the packet too soon, the application program may modify the contents of buffers 221, 223, and 225 while an interface was reading data from those buffers to send across a network segment, resulting in a failed transmission of packet 231. Thus, if the wire-based NIC 53 completes sending the data contained in buffers 221, 223, and 225, it can return the base packet descriptor 202 to the intermediate driver 120 and signal that it has completed its transmission. The intermediate driver can decrement the counter 203 to record this fact. However, the remaining value in counter 203 will indicate to the intermediate driver that a child packet has still not been returned. Thus the intermediate driver 120 can refrain from returning original packet descriptor 232 to the sending application 36. Once the wireless NIC 54 completes its transmission, it can return child packet descriptor 212 and signal to the intermediate driver that it has completed sending the packet. The intermediate driver 120 can then discard the child packet descriptor 212 and decrement the counter 203 in the base packet descriptor 202. Because the counter 203 now contains a value indicating that all child packets have been returned, the base packet descriptor 202 can also be discarded. The intermediate driver 120 can then return the original packet 231 to the application 36, which can, in turn, reuse the memory locations 221, 223, and 225. In this way, the intermediate driver 120 can send the packet 231 through multiple interfaces simultaneously, without exposing any of the complexity to the application program 36.

If the packet to be sent through multiple interfaces is received through a network interface, as opposed to sent by a local application as described in detail above, the intermediate driver 120 is not given control of the memory in which the received packet is stored, but instead can copy the data into its own memory locations. As is known by those of skill in the art, a received packet is stored in the network interface card's buffers. Because of the limited size of the network interface card's buffers, and because of the constant flow of packet data into and out of the buffers, it is desirable to reuse the memory storage space of the buffers as often as possible. Thus, when a packet is received on a particular network interface, the intermediate driver 120 can copy the packet into its own memory, allowing the interface to efficiently reuse the memory previously occupied by the received packet.

Figure 6:
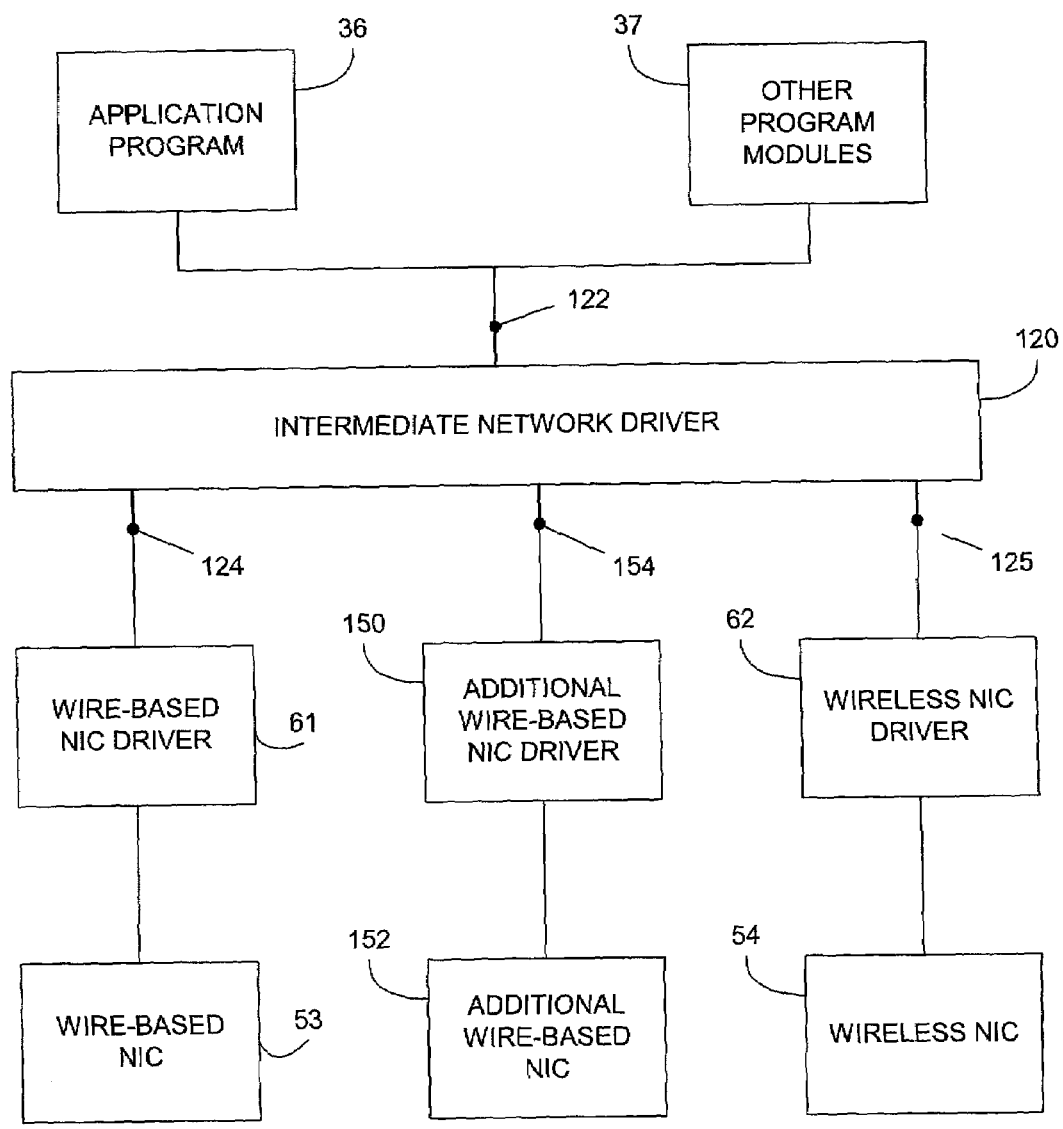
FIG. 6 is a block diagram generally illustrating alternative networking layers in which the present invention operates.

Turning to FIG. 6, the networking components of FIG. 3 are shown with an additional wire-based NIC 152 and its associated driver 150, connected to port 154 on the software bridge implemented as the intermediate network driver 120. In such a network environment, a broadcast packet from a computer on the network segment connected to the additional wire-based NIC 152 can be received by NIC 152 and passed to the intermediate driver 120 through the additional wire-based NIC driver 150. As was explained above, to avoid congesting the buffer of the additional wire-based NIC 152, the intermediate driver will copy the received broadcast packet data into its own memory space. To copy the packet data into its own memory, the intermediate driver 120 can create a packet descriptor such as base packet descriptor 702, shown in FIG. 7. Base packet descriptor 702 can have descriptors 706, 708, and 710 which point to the locations in memory 724, 726, and 728 into which the data of the received broadcast packet is stored by the intermediate driver. Thus, packet 700, shown in FIG. 7, is the intermediate driver's copy of the broadcast packet received by NIC 152.

Because the intermediate driver 120 retains control over base packet 700, and does not need to return it to a sending application, as was the case above with original packet 231, the base packet descriptor 702 can contain additional information for the use of the intermediate driver. Thus, in creating the base packet descriptor 702, the intermediate driver can add a counter 704 to determine when the packet 700 can be released. After examining the contents of the received packet, now stored in buffers 724, 726, and 728, the intermediate driver can determine the intended destinations of the packet. In the case of a broadcast packet received through port 154, the intermediate driver 120 can deliver the packet to higher level applications or protocols on the host computing device 20 through higher level interface 122, and can send the packet to the other network segments through ports 124 and 125. To accomplish this broadcast in parallel, the intermediate driver can create three packet descriptors to provide to the higher level applications and to the other two network interfaces. Because it has already created the base packet descriptor 702 so that it could copy the received packet data into its own memory, the intermediate driver need only create two additional packet descriptors. In one embodiment, the base packet descriptor can be indicated to the higher level applications and protocols, while the child packet descriptors are given to the appropriate network interfaces.

Figure 7:
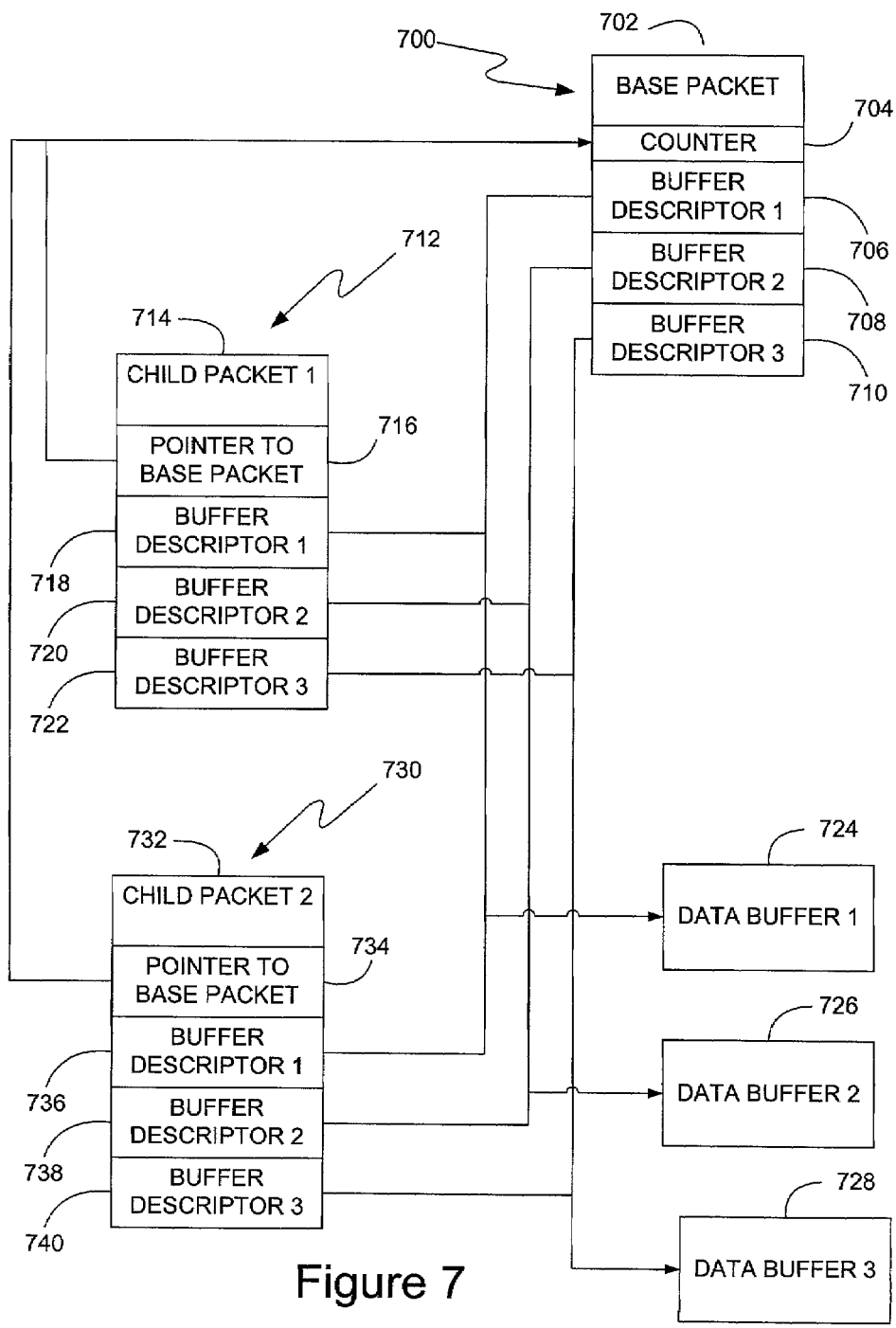
FIG. 7 is a block diagram generally illustrating an alternative packet structure used by the present invention.

FIG. 7 illustrates two child packets 712 and 730 created by the intermediate driver 120. Each packet descriptor 714 and 732 contains descriptors 718, 720 and 722, and 736, 738, and 740, respectively, which point to the same memory locations 724, 726, and 728 as the descriptors 704, 706, and 708 of the base packet descriptor 702. As above, the child packets 712 and 730 are, therefore, the same as base packet 700; and, as above, the creation of child packets 712 and 730 does not consume significant memory resources because the data of the packets, contained in buffers 724, 726, and 728 was not copied. Each child packet descriptor 714 and 732 contains a pointer 716 and 734, respectively, to the base packet 700. For each child packet, the counter 704 of the base packet descriptor 702 is incremented. In one embodiment, the counter 704 can start at 1, so that it tracks the existence of the base packet in addition to any outstanding child packets. In such an embodiment, a value of 1 indicates that there are no further outstanding child packets and the base packet can be released or deleted. As an alternative, the counter 704 can begin at zero and track only the child packets. If the counter begins at zero, then any non-zero value can indicate the existence of outstanding child packets.

The intermediate network driver 120 can provide child packet 730 to the wireless NIC driver 62 to send across the wireless network segment 102, provide child packet 712 to the wire-based NIC driver 61 to send across the wire-based network segment 100, and provide base packet 700 to the higher level application program or protocol on bridge host computer 20. The wire-based NIC driver 61 will retain control over the child packet descriptor 714 while the child packet 712 is read from buffers 724, 726, and 728 and sent over the network by the wire-based NIC 53. When the wire-based NIC 53 has completed sending the packet, the driver 61 will return the child packet 712 to the intermediate driver 120, which can then discard it and decrement the counter 704. Similarly, when the wireless NIC 54 finishes sending the packet, and returns the child packet 730 to the intermediate driver 120, the intermediate driver can discard the child packet 730 and decrement the counter 704. In an analogous manner, the higher level application or protocol can copy the base packet 700 into its own memory space for processing, returning the packet to the intermediate driver 120. When the intermediate driver receives the returned descriptors 700, 714 or 732, and after decrementing the counter 704, it checks whether the counter 704 has reached a value of zero. When the counter 704 reaches a value of zero, the intermediate driver can discard the packet 700. When the packet 700 is discarded, the intermediate driver 120 is free to re-use memory spaces 724, 726, and 728. Thus, because the intermediate driver copied the packet data into its own memory space, it does not need to return it, unlike the situation illustrated in FIG. 4 and described in detail above, where the intermediate driver needed to return the received packet.

Despite the method used by the intermediate driver 120 to create duplicate packets, a single transmission success or failure is often requested by the sending application or network interface. Thus, while the bridge internally creates and sends multiple packets, to the sending application or interface it appears as if only a single packet was sent. The intermediate driver 120 can provide a composite packet status, such that a successful transmission is reported if at least one transmission of the duplicate packets was successful. If no transmissions were successful, then a failure can be reported. Such a scheme can operate most effectively in networks such as an Ethernet network where only a best-effort attempt to deliver a packet needs to be made. Most often a broadcast packet, such as would be sent to multiple interfaces, is sent because the sender does not know on which network segment the appropriate destination is located. Therefore, if the packet is sent out through at least one interface, then there is a non-zero probability that it will reach its intended destination. This is all that is necessary to report a success in a network which only requires a best-effort attempt. Should a different type of network environment be used, the intermediate driver could report a successful transmission only if all, or a given percentage, of the simultaneous transmissions were successful.

In one preferred embodiment, the software bridge is implemented as an intermediate driver conforming to the NDIS protocols as described above. The structure of an NDIS packet can be as follows:

```
typedef struct _NDIS_PACKET
{
NDIS_PACKET_PRIVATE   Private;
   union
   {
   struct                       // For Connection-less miniports
       {
       UCHAR   MiniportReserved[2*sizeof(PVOID)];
       UCHAR   WrapperReserved[2*sizeof(PVOID)];
       };
   struct
       {
       //
       // For de-serialized miniports. And by implication
       // conn-oriented miniports. This is for the send-path
       // only. Packets indicated will use WrapperReserved
       // instead of WrapperReservedEx
       //
       UCHAR   MiniportReservedEx[3*sizeof(PVOID)];
       UCHAR   WrapperReservedEx[sizeof(PVOID)];
       };
   struct
       {
       UCHAR   MacReserved[4*sizeof(PVOID)];
       };
   };
ULONG_PTR  Reserved[2];        // For compatibility with Win95
UCHAR      ProtocolReserved[1];
} NDIS_PACKET, *PNDIS_PACKET, **PPNDIS_PACKET;
```

Variables Private, WrapperReserved, and MacReserved are reserved for use by NDIS and MiniportReserved and ProtocolReserved can be used by NDIS drivers for their own purposes. Buffer descriptors, known as memory descriptor lists (MDLs) can be chained onto the end of the packet structure above. In one preferred embodiment, the intermediate driver 120 can use the MiniportReserved or the ProtocolReserved elements to store information such as the pointers to the base packet and the counter described above. In another preferred embodiment, the intermediate driver 120 can use a PACKET_INFO structure, defined in more detail below, to store such information. In the preferred embodiment where the PACKET_INFO structure is used to store such information, a pointer to the PACKET_INFO structure can be stored in the MiniportReserved or ProtocolReserved elements to link the PACKET_INFO structure to the corresponding packet structure described above.

The software bridge implemented as an NDIS intermediate driver can maintain information about each packet, such as the pointer to the base packet, and the counter, whose use was described in detail above. One format which can be used by the bridge is as follows:

```
typedef enum
{
   BrdgPacketInbound = 0,
   BrdgPacketOutbound = 1,
   BrdgPacketCreatedInBridge = 2,
   BrdgPacketDirectionImpossible = 4
} PACKET_DIRECTION;
typedef struct _PACKET_INFO
{
```

```
// Used by buffering code only
BSINGLE_LIST_ENTRY        List;
PNDIS_PACKET              pOwnerPacket;
// These fields used by packet processing code
struct
{
    UINT                  bIsBasePacket: 1;
    PACKET_DIRECTION      OriginalDirection: 2;
} Flags;
union
{
    // This part of union valid if bIsBasePacket == FALSE
    struct _PACKET_INFO   *pBasePacketInfo;
    struct
    {
        // This part of union valid if bIsBasePacket == TRUE
        PNDIS_PACKET      pOriginalPacket;
        PADAPT            pOwnerAdapter;
        LONG              RefCount;
        NDIS_STATUS       CompositeStatus;
    } BasePacketInfo;
} u;
} PACKET_INFO, *PPACKET_INFO;
```

The List structure allows the PACKET_INFO structures to be queued, as will be described in more detail below. Each NDIS packet, in the form of the NDIS_PACKET structure defined above, can be recovered from its corresponding PACKET_INFO structure through the pOwnerPacket field, which contains a pointer to the NDIS_PACKET structure with which the PACKET_INFO structure is associated. In this way the intermediate driver 120 can add the additional elements such as the pointers to the base packet and the counter, as described above. Thus, the PACKET_INFO structure contains bIsBasePacket, which indicates whether the packet is the base packet; pBasePacketInfo, which is a pointer to the base packet if the packet is not the base packet; pOriginalPacket, which is a pointer to the original packet; and RefCount, which is the counter described above. Additionally, element OriginalDirection indicates whether the packet was received from an underlying NIC, or from a higher level protocol or application. It can be set to BrdgPacketOutbound for local-sourced packets, or BrdgPacketCreatedInBridge for packets created within the bridge to wrap a received packet. Also, element pOwnerAdapter identifies the adapter to which pOriginalPacket is to be returned, if necessary.

In a preferred embodiment using the NDIS system and structures described above, the intermediate driver 120 can provide for transmission of a single packet through multiple interfaces simultaneously, in the manner described in detail above. Turning to FIG. 4, original packet 231 can be provided to the intermediate driver by either a NIC driver or a higher level application. Once the multiple parallel transmissions of the data of original packet 231 are completed, the intermediate driver 120 can return the original packet to the NIC driver or the higher level application. As stated above, the PACKET_INFO structure contains the OriginalDirection element, which can indicate to the intermediate driver whether the original packet 231 was received from a NIC driver or from a higher level application. Should the packet 231 have been received from a NIC driver, the intermediate driver 120 can return it to the NIC driver with a call to NdisReturnPackets, whereas if the packet 231 was received from a higher level application, the intermediate driver can return it with a call to NdisMSendComplete.

In another preferred embodiment, the intermediate driver 120 can avoid the creation of the additional packet descriptors where it is given control over the original packet. Where the packet received by the intermediate driver need only be sent to a single network interface, or where it needs only to be indicated to the host computing device 20, but not relayed to it, the intermediate driver itself can use the ProtocolReserved or the MiniportReserved area of a packet descriptor header. Alternatively, the intermediate driver can create a new packet descriptor in the format of the PACKET_INFO structure above.

A dynamic memory allocation scheme can be used with the software bridge of the present invention to minimize the number of packets discarded as a result of insufficient buffer storage, while maintaining a fair allocation of resources, and not exceeding the memory constraints placed on the networking subsystem. As has been explained above, the intermediate network driver 120 implementing the software bridge presents the underlying network segments and their interfaces to the higher level applications and protocols on the host computing device 20 as a single network and interface. Thus, as perceived by the operating system 35 of the host computing device 20, only a single interface requests and is provided with memory. The intermediate driver 120 can then use this memory to buffer packets for the underlying network interfaces.

A dynamic memory allocation scheme for allocating memory among a number of network interfaces to be used as buffer space is described in detail in a co-pending United States patent application, hereby incorporated by reference in its entirety, entitled "Dynamic Resource Allocation Scheme", filed on Mar. 2, 2001 and assigned to the assignee of the present application. Briefly, the dynamic memory allocation scheme contemplated by the above listed application attempts to buffer as many packets for a network interface as are needed, while maintaining a safety buffer to provide a level of fairness and reserve some amount of memory to satisfy minimal packet buffering requests from other network interfaces.

A network interface can request a that a packet be stored in a segment of memory either if the packet is to be transmitted and it cannot be due to network congestion, or if the packet is an incoming packet that must be received into some memory location. Once the particular packet for which the memory was requested has been dealt with, the memory in which it was stored can be returned to available memory for redistribution to another network interface. The intermediate network driver 120 can determine a fair share of memory for each network interface by dividing the available memory by the number of network interfaces. Each interface's request to buffer a packet into a segment of memory can be granted so long as the intermediate driver has available memory, and the interface has not yet consumed more than its fair share of memory, determined in the manner above. If an interface has consumed more than its fair share of memory, it can still be granted further requests to buffer packets into additional segments of memory if the memory available to the intermediate driver is greater than a pre-defined safety buffer.

The interplay between these two rules creates a system by which a network interface can have more packets buffered for it by the intermediate network driver than it could in a static scheme which merely divided the available memory equally between the interfaces; while simultaneously implementing a level of fairness such that sufficient memory exists for additional interfaces. Consider a first network interface which, due to network congestion, requires a significant amount of memory to buffer all of the packets waiting to be sent when the congestion is resolved. The above dynamic allocation scheme will allow the first interface to buffer packets until the intermediate network driver has used all of the available memory, except for a safety buffer. If a second network interface becomes congested, such that it too requires packets to be buffered, its packets can be stored into the memory remaining as the safety buffer. As the second interface requests packets to be buffered into the memory from the safety buffer, the safety buffer is slowly consumed. However, concurrently, additional requests from the first interface can be denied because the free memory remaining is less than the safety buffer. While additional requests from the first interface are being denied, some packets are being transmitted, and the memory in which those packets were stored can be reused by the intermediate network driver. Thus, because requests for additional memory are being denied, and previously allocated memory is being reused, the total memory consumption of the packets buffered for the first interface is decreasing. Subsequently, the returned memory can be used to satisfy requests from the second interface, as that interface has not yet used up its fair share. Ultimately, assuming that congestion continues in both network segments, and that the interfaces continue to request the buffering of packets at approximately the same rate, the allocation of memory between the two interfaces will reach a steady-state where each interface is consuming at least its fair share of memory.

When the intermediate network driver 120 is performing a multiple interface transmission in parallel, as described above, the base packet and child packets must be accounted for to determine the memory allocation of each interface as required by the above dynamic allocation scheme. While individual child packets can be released by the interface after they are sent, the base packet is not released until all child packets referring to its underlying data have been released. Slow interfaces can, therefore, cause increased memory consumption by requiring that packet data remain in memory, even though all other interfaces may have completed their transmission of that data. To avoid such increased consumption, the present invention contemplates counting data shared between multiple child packets as if it were individually consumed by each target interface, even though only one instance of the packet data exists in memory. In such situations a sum of each adapter's allocated memory may yield a value greater than the total memory available. Such a result is not of concern as the memory is, in fact, being shared between multiple interfaces, and is therefore being double-counted.

In a preferred embodiment, such as described above, where the network bridge is implemented as an NDIS intermediate driver in an Ethernet-network, the allocation and deallocation of memory to individual network interfaces can be made faster through the use of caching systems if the intermediate driver does not preallocate its maximum permitted memory block. The software bridge can maintain a cache for copy packets and wrapper packets where the cache is equal to the safety buffer size for the pool of available memory for each type of packet. Furthermore, data buffers, and PACKET_INFO structures, such as those described in detail above, can be allocated from the operating system's 35 kernel lookaside lists, which cache freed blocks. The size of the lookaside lists' caches can be continuously monitored and adjusted by the operating system 35 to reflect actual usage conditions.

A preliminary examination, by the software bridge, of received packets can increase the consistency and minimize the length of time between the receipt of a packet by a network interface and the return of control to the network interface from higher level network software. Turning to FIG. 3, when a NIC, such as NICs 53 and 54, receive a packet from the network segment to which they are connected, the NIC drivers 61 and 62 temporarily store the packet into a buffer and send an indication to a higher level driver, such as intermediate driver 120, that a packet has been received. Once the received packet has been indicated to the intermediate driver 120, the intermediate driver must respond to the indication before the NIC driver can resume processing inbound packets.

Therefore, to increase network efficiency, it is desirable to reduce the time the NIC driver spends waiting for the intermediate driver to respond, and increase the predictability of that interval of time. The software bridge of the present invention, implemented as intermediate network driver 120, can preliminarily perform a minimal analysis to determine whether the received packet requires processing by it or on the part of the host computer 20. If the packet requires processing, it is placed on a queue and processing is quickly returned to the underlying NIC driver. If the packet does not require processing, either by the intermediate network driver 120, or the host computing device 20, it is simply discarded. Packets from one computer to another computer on the same network segment require no bridge processing. Packets which require processing are processed by a worker thread that services each receiving NIC's queue of received packets.

Each NIC has associated with it a received packet queue, which can be serviced by a queue-servicing thread. A thread to process the packets in the queue can be requested through an associated auto-clearing event. The intermediate driver 120 can create a queue-servicing thread for each processor when the intermediate driver is initialized by the operating system 35. A queue-servicing thread can block against all NIC packet queue events. When a NIC's received packet queue receives a packet to be processed, a queue servicing thread, which can be selected at random, can unblock and process the packets in the queue. To insure that no queue-servicing thread operates for an extended duration, the number of packets processed by a thread on a given call can be limited. Once the thread has either completed processing all of the packets in the queue, or it reached the limit on the number of packets it can process, it can block against all NIC packet queue events again. If the thread was not able to clear the packets in the queue, it can signal another thread to begin processing. This can ensure maximum parallel execution without unnecessary thread overhead by limiting the processing to one thread per processor. By limiting the maximum number of packets which can be processed by a single thread, the system can ensure that each queue is given an opportunity to be serviced.

The intermediate driver 120 can also process received packets directed only to the host computing device 20 in a more efficient manner. Packets between computers on different network segments require processing by the software bridge implemented as the intermediate driver 120. However, packets directed only to the host computing device 20 only require minimal processing by the intermediate driver 120, and can be passed directly to higher level applications and protocols, such as application 36. In the preferred embodiment described above, packets directed only to the host computing device 20 can be processed without the need to allocate additional PACKET_INFO structures. Instead, the intermediate driver 120 can store necessary information in the ProtocolReserved or MiniportReserved area of the packet structure itself. By avoiding the creation and linking of an additional PACKET_INFO structure, the processing by the intermediate driver can be minimized.

Received packets which are directed only to the host computing device 20 need not be placed on the NIC's processing queue, but can instead be passed by the intermediate driver 120 to higher level applications and protocols directly when the intermediate driver initially examines the packet to determine whether to place the packet on the NIC's processing queue. However, if the processing queue of the NIC is not empty, then packets directed only to the host computing device 20 need to be placed on the queue and not sent immediately to higher level software, or they would be received by such higher level software out of order, resulting in an inappropriate processing of data.

Figure 8A:
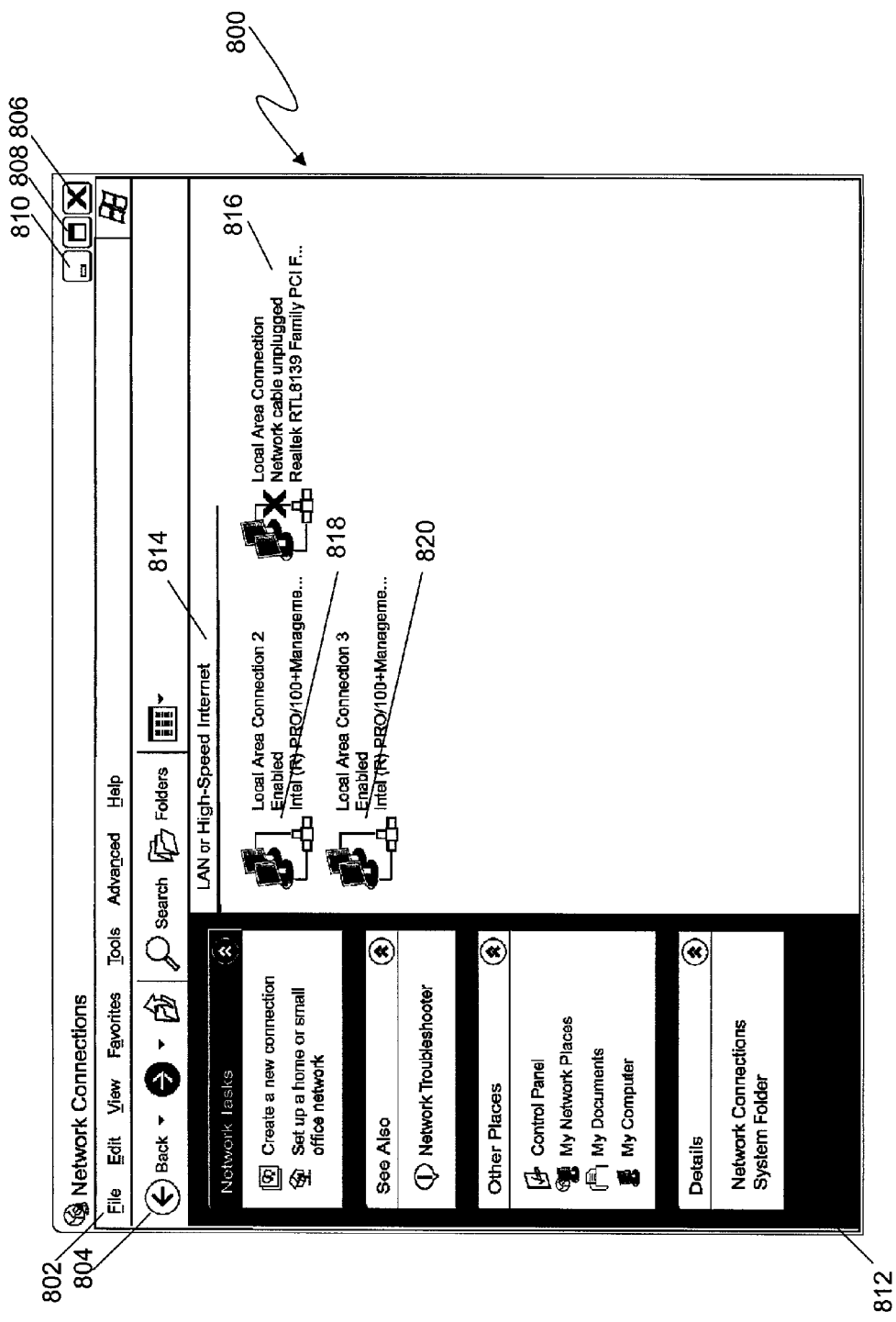
FIGS. 8a through 8d are screen images generally illustrating an exemplary user interface presented by the present invention.
Figure 8B:
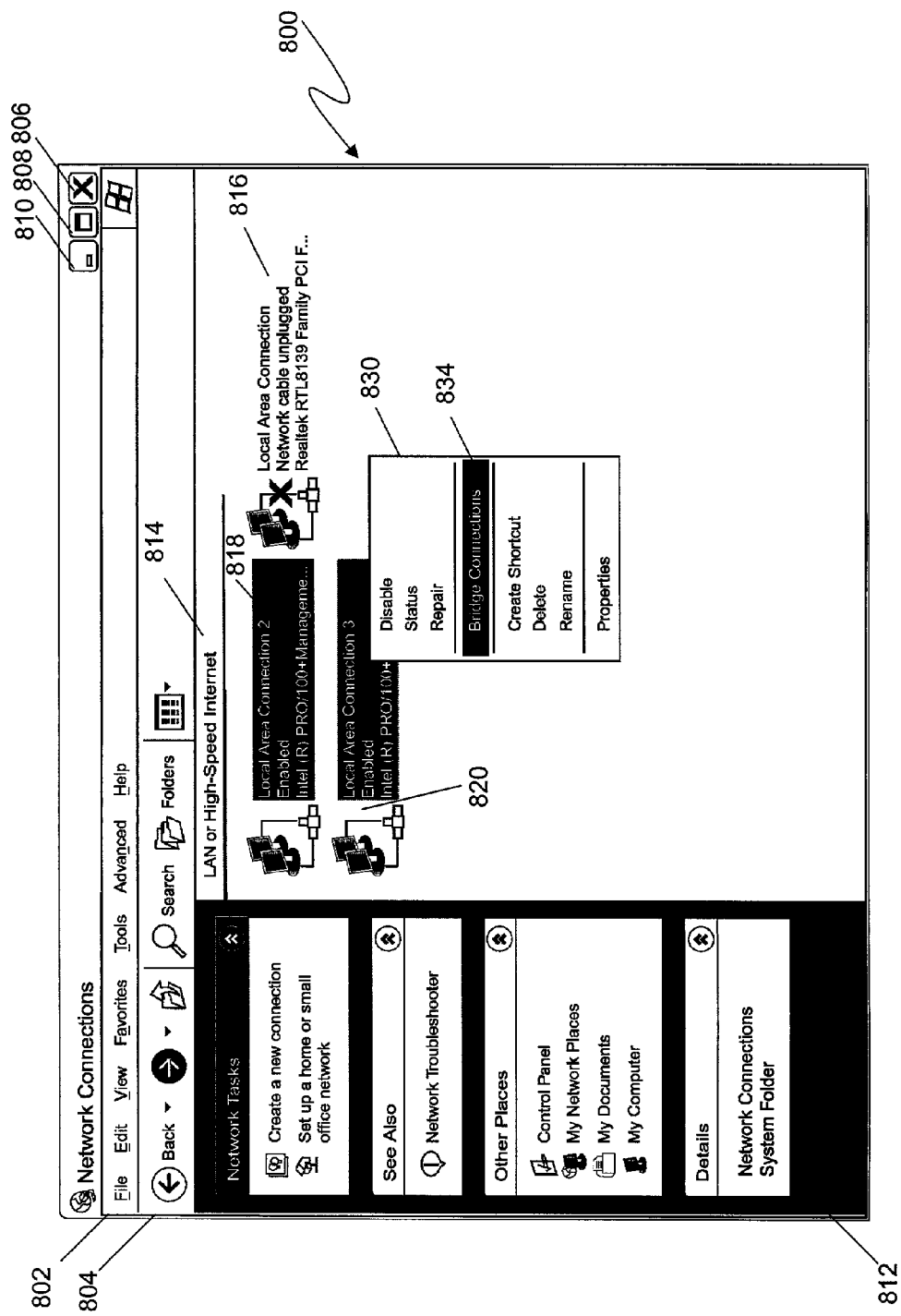
Figure 8C:
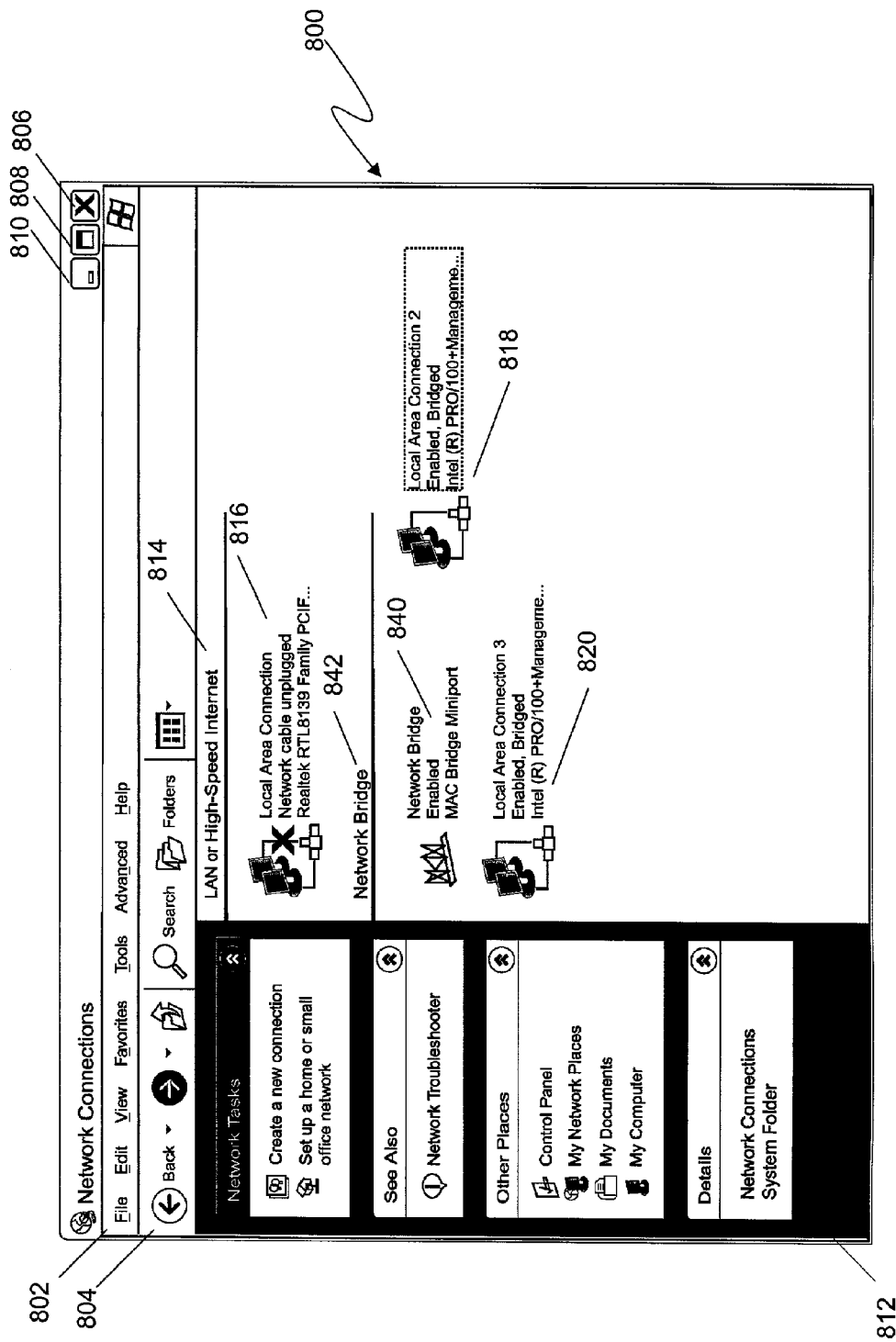
Figure 8D:
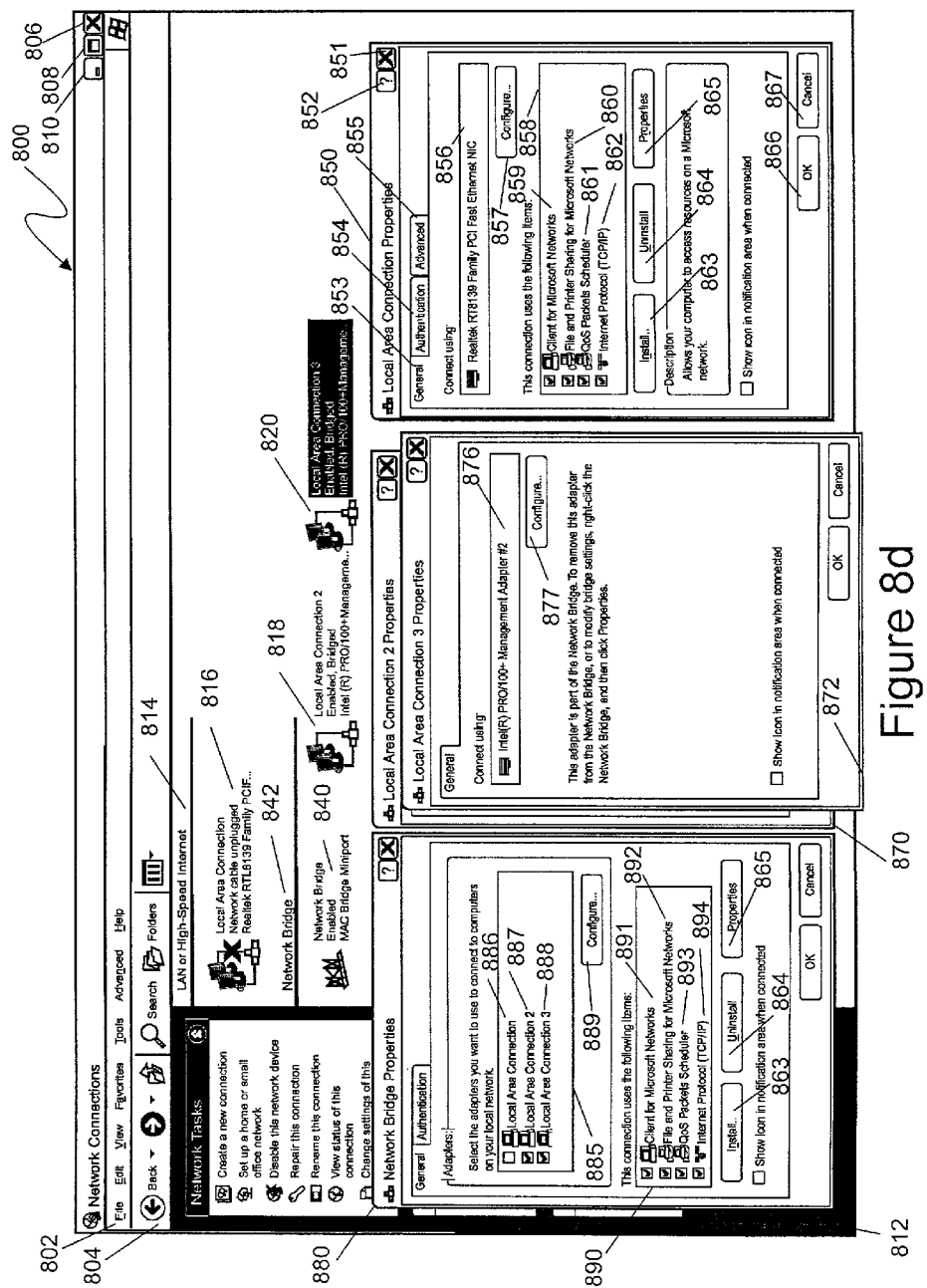

Turning to FIG. 8*a*, one exemplary user interface is shown for providing the user access to the functionality of the intermediate network driver 120 and underlying network components. The exemplary user interface is contained within a window 800, such as would be displayed to the user through monitor 47 of computing device 20. The window 800 can contain a close button 806 for closing the window, a maximize button 808 for increasing the size of the window to the fill the monitor display, and a minimize button 810 for decreasing the size of the window, such as placing the window within a list of minimized windows, or as an icon in a dock of icons of minimized windows. Window 800 can also contain a menu bar 802 providing the user easier access to functionality, and a browser bar 804, allowing the user to navigate through different presentations of information. The window 800 can also set aside an area, such as area 812 to provide the user single-click access to other functions or files of the computing device 20.

The window 800 of FIG. 8*a* includes an area 814 which can display, in a graphical manner, the various network segments or network interfaces available. For example, in the example shown in FIG. 8*a*, the computing device 20 is connected to three different network segments through three different network interface cards. Those three connections are graphically displayed within the area 814 as user interface elements, namely connection icons 816, 818, and 820, entitled "local area connection", "local area connection 2" and "local area connection 3", respectively. Each of the connection icons can allow a user to access the properties of the network segment or the network interface which is represented by that connection icon. The user interface elements representing the network segments need not be iconic. In an alternative exemplary user interface, the user interface elements can be textual, or convey their representation of the network segments through colors or physical location within a display area.

Turning to FIG. 8*b*, one exemplary method for accessing the bridging functionality of the intermediate network interface 120 is shown. In the exemplary method shown, connection icons 818 and 820 are simultaneously selected by the user and a functionality selection element, such as the "bridge connections" selection 834 can be accessed such as from a drop down menu 830. The drop down menu 830 can be accessed through the menu bar 802, by "right-clicking" (as it is known in the art) on one of the selected icons 818 or 820, or through an equivalent method. Alternatively, a different function selection element could be used, such as a "bridge connections" icon or a combination of user pressed keys on the keyboard 40, known in the art as a "keyboard shortcut". By selecting the "bridge connections" function 834, or other similar function selection element, the user instructs the computing device 20 to use the intermediate network driver 120 to bridge the two selected network segments in the manner described above.

FIG. 8*c* illustrates one exemplary method of presenting to the user a bridged network. Area 814 now only contains the connection icon 816, which is not part of the bridged network. A new bridged area 842 can be created, containing the connection icons 818 and 820 identifying the network segments which comprise the bridged network. In addition, the user can be presented a single user interface element representing the entire bridged network, such as bridge icon 840. The intermediate network driver 120 exposes the bridged network segments as a single network interface to the higher level networking software as described above. The user can similarly be provided with a single interface (i.e. bridge icon 840) for accessing the properties of the bridged network as a whole. As above, the user interface element need not be an icon, and can be, for example, a textual or color or location-based representation of the bridged network.

Turning to FIG. 8*d*, an exemplary interface providing the user access to the properties of the network segments and the bridged network is shown. FIG. 8*d* shows property presentation elements in the form of four sub-windows 850, 870, 872, and 890, entitled "local area connection properties", "local area connection properties 2", "local area connection properties 3", and "network bridge properties", respectively. Each of these sub-windows can allow the user to access and change the properties of the network or network connection they represent. Such sub-windows can be accessed, in one embodiment, by double-clicking on a connection icon, or by right-clicking on the connection icon and then selecting an access properties command from the menu which appears. In an alternative embodiment, the property presentation elements could be, for example, strictly iconic representations or a pure textual listing.

Property presentation element sub-window 850 illustrates an exemplary user interface providing a user access to the properties of a network interface, in this case the network interface labeled "local area connection" and identified by connection icon 816. The sub-window 850 includes a sub-window close button 851 for closing the sub-window, and a sub-window help button 852 for providing help to the user, such as help in deciphering and accessing the properties displayed in the sub-window 850. The sub-window 850 can also be dismissed through the OK button 866, which can store the changes indicated by the user, or the Cancel button 867, which can revert all of the properties to their state prior to the most recent user interaction.

Within the sub-window, the user can be presented with choices regarding the nature of the property sought to be edited. The exemplary sub-window 850 shown in FIG. 8*d* contains choices labeled "General", "Authentication" and "Advanced" offered to the user through tabs 853, 854, and 855, respectively. Tab 853 is shown as activated, allowing the user access to "general" properties of the network connection. One such property which can be presented to the user is the particular network interface card which is used to connect to the network segment selected. Network card display 856 shows the currently selected network interface card. In one embodiment, a different card can be selected through a drop-down menu which could appear when the user clicked on the network card display 856. In an alternative embodiment, the user could change the network interface card by accessing additional options through the configure button 857. Another property which can be presented to the user within the sub-window 850 are higher level networking software and protocols which are to be used or provided over the selected network interface. The user can be presented with this property through the use of a item selection element, such as item window 858, which, in the exemplary embodiment illustrated in FIG. 8*d*, contains a number of higher level networking software items which can be activated over the selected network, such as a network client feature 859, a file and printer sharing feature 860, a quality of service packet scheduler 861, and protocols, such as TCP/IP 862. The user can add further options to this list through the install button 863, or the user could remove some of the options with the uninstall button 864. Additional properties of each higher level networking software or protocol could be accessed by the user through the properties button 865. In addition, the user can select which of the higher level networking software or protocols are to be made available over the particular network connection by checking or un-checking the selection boxes located to the left of each of the options.

Sub-windows 870 and 872 are the analogues to sub-window 850 for connection icons 818 and 820, respectively, representing additional network segments. However, because the network segments represented by connection icons 818 and 820 are bridged in the particular embodiment illustrated in FIG. 8*d*, the user's access to certain properties can become limited. This is to prevent the user from creating inconsistencies among the network segments which are bridged together. For example, sub-window 872 20 contains a network card display 876, which can allow the user to view and change the current network interface card connecting the selected network segment to the computing device 20. The user may also be able to change the network interface card via the configure button 877. However, the user may not be allowed to access or change the higher level networking software or protocols which are active over the current network segment. If the user were allowed to change such settings, the purpose of the bridging functionality of the present invention could be undermined. Recall that the intermediate network driver 120 conglomerates multiple network segments that are bridged together into a single virtual network, such that the higher level software on the computing device recognizes only the single virtual network. Allowing the user to change the properties of a single network segment of the bridged network would no longer expose the bridged network as only a single virtual network. For example, if the user were allowed to change the protocols, such as deactivating the use of the TCP/IP protocol, on an individual network segment which is bridged together with other network segments, the higher level networking software would recognize the bridged network as a first network, and would also separately recognize the individual network segment as a second network. A broadcast packet would, therefore, be sent to the whole bridged network (including the individual network segment), and to the individual network segment by itself, resulting in duplicate packets for each computer on the individual network segment. As will be known by those skilled in the art, further inconsistencies are also possible. Thus, in one embodiment, the user interface of the present invention prevents the user from changing the higher level software and protocols operating over individual segments once they have been bridged according to the method described above.

However, because the bridged network can be provided its own connection icon 840, the user interface can allow the user to change the higher level software and protocols active over the bridged network as a whole. Sub-window 880 illustrates an exemplary window for allowing the user to access and modify the properties of the bridged network as a whole. For example, sub-window 880 contains item window 890, analogous to item window 858 of sub-window 850. Within item window 890, the user is presented with any number of higher level networking software items which can be activated or deactivated over the bridged network, such as a network client feature 891, a file and printer sharing feature 892, a quality of service packet scheduler 893, and protocols, such as TCP/IP 894. The exemplary user interface can allow the user to activate or deactivate the items through the use of a selection box located to the left of the item. Additionally, the user can be allowed to add new items or remove existing ones via the install button 895 and the uninstall button 896, respectively. The user can also be allowed to obtain further information regarding selected higher level networking software or protocols through the properties button 897. Another element within sub-window 890 is the bridged network segment view 885. The bridged network segment view 885, which is another type of item selection element, provides the user with a more familiar selection box mechanism for bridging various network segments. For example, in the exemplary embodiment shown in FIG. 8*d*, local area connection item 886 is not part of the bridged network and local area network 2 item 887 and local area connection 3 item 888 are part of the bridged network. Recall from the description of the exemplary user interface above that these two network segments were selected as connection icons 818 and 820 and were initially bridged together. The selection box interface allows the user to easily add additional network segments to the bridged network, such as the network segment represented by item 886. Further configuration options can be presented to the user through the configure button 889.

As can be appreciated by those skilled in the art, the exemplary embodiment of the user interface presented in FIGS. 8*a* through 8*d* is but one of many different methods for presenting the functionality described above to a user of a computing device. Such functionality can also be presented to the user through a text-based user interface, for example. Alternatively, colors or proximity rather than separate windows can be used to indicate associations in a graphical user interface.

Similarly, the software network bridge of the present invention is equally applicable to many different types of computing environments. For example, the present invention can be applied to a variety of different operating system environments, including very limited operating systems with only memory management functionality. Similarly, the present invention can be used in networks containing many different types of computing devices, such as personal computers, handheld computers, mainframes, and dedicated processing systems. The software bridge enables two or more network segments to be viewed as a whole, both from the networked devices, and from the host computing device, and allows for efficiencies in multiple destination packet transmission, network interface buffer management, and received packet processing.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of bridging multiple network segments and exposing the multiple network segments as a single network to a higher level networking software on a bridging computing device, the bridging computing device connected to the multiple network segments through multiple network interfaces and exposing the single network through a higher level interface, the method comprising:

receiving a first packet from the higher level networking software or from one of the multiple network interfaces;

determining a first destination address of the first packet;

locating the first destination address in a database;

determining, by reference to the database, a first port through which the first destination address can be reached;

processing the first packet with reference to the first port, including:

placing the first packet onto a received packet queue, requesting a first queue-servicing thread to process the received packet queue, and processing the received packet queue with the first queue-servicing thread;

wherein the processing of the received packet queue is for a limited duration; and wherein the processing the first packet with reference to the first port further includes:

requesting a second queue-servicing thread after the limited duration if the received packet queue contains at least one queued packet; and processing the received packet queue with the second queueservicing thread.

2. A method of bridging multiple network segments and exposing the multiple network segments as a single network to a higher level networking software on a bridging computing device, the bridging computing device connected to the multiple network segments through multiple network interfaces and exposing the single network through a higher level interface, the method comprising:

receiving a first packet from the higher level networking software or from one of the multiple network interfaces;

determining a first destination address of the first packet;

locating the first destination address in a database;

determining, by reference to the database, a first port through which the first destination address can be reached;

processing the first packet with reference to the first port;

identifying a root bridge with reference to a lowest bridge identifier;

identifying a root port with reference to a most efficient network route to the root bridge;

identifying a designated port with reference to a connection to one of the multiple network segments through which a packet is received for forwarding to the root bridge; and blocking a port if the port is neither the root port nor the designated port.

3. A method of bridging multiple network segments and exposing the multiple network segments as a single network to a higher level networking software on a bridging computing device, the bridging computing device connected to the multiple network segments through multiple network interfaces and exposing the single network through a higher level interface, the method comprising:

receiving a first packet from the higher level networking software or from one of the multiple network interfaces;

determining a first destination address of the first packet;

locating the first destination address in a database; and determining, by reference to the database, a first port through which the first destination address can be reached;

processing the first packet with reference to the first port;

wherein the multiple network interfaces to the multiple network segments are granted a memory segment through a dynamic memory allocation method, the dynamic memory allocation method comprising:

receiving a memory segment request for the memory segment from a first network interface of the multiple network interfaces;

determining a fair share of memory of the first network interface;

determining a safety buffer of memory;

granting the memory segment if a first network interface memory allocated to the first network interface is less than the fair share of memory of the first network interface and an available memory segment exists; and granting the memory segment if the first network interface memory allocated to the first network interface is greater than the fair share of memory of the first network interface and the available memory segment is greater than the safety buffer of memory.

4. A method of bridging multiple network segments and exposing the multiple network segments as a single network to a higher level networking software on a bridging computing device, the bridging computing device connected to the multiple network segments through multiple network interfaces and exposing the single network through a higher level interface, the method comprising:

receiving a first packet from the higher level networking software or from one of the multiple network interfaces;

determining a first destination address of the first packet;

locating the first destination address in a database; and determining, by reference to the database, a first port through which the first destination address can be reached;

processing the first packet with reference to the first port; and exposing to a user a user interface comprising:

a user interface element for each of the multiple network segments;

a function selection element for bridging at least two of the multiple network segments into the single network;

a user interface element for the single network; and a property presentation element for providing the user access to a property of a selected network, the selected network being one of the multiple network segments or the single network;

wherein the selected network is the single network, and wherein the property presentation element comprises an item selection element for bridging another of the multiple network segments into the single network.

5. A method of bridging multiple network segments and exposing the multiple network segments as a single network to a higher level networking software on a bridging computing device, the bridging computing device connected to the multiple network segments through multiple network interfaces and exposing the single network through a higher level interface, the method comprising:

receiving a first packet from the higher level networking software or from one of the multiple network interfaces;

determining a first destination address of the first packet;

locating the first destination address in a database; and determining, by reference to the database, a first port through which the first destination address can be reached;

processing the first packet with reference to the first port; and exposing to a user a user interface comprising:
a user interface element for each of the multiple network segments;
a function selection element for bridging at least two of the multiple network segments into the single network;
a user interface element for the single network; and
a property presentation element for providing the user access to a property of a selected network, the selected network being one of the multiple network segments or the single network;

wherein the selected network is a bridged network segment, and wherein the property presentation element prevents the user from accessing an item selection element for editing a higher level networking software or protocol which is active over the bridged network segment.

6. A computing device for bridging multiple network segments and exposing the multiple network segments as a single network, the computing device comprising:

multiple network interfaces connected to the multiple network segments;

a database comprising a network address and a corresponding port through which the network address can be reached; and an intermediate network interface driver for exposing the multiple network segments as the single network through a higher level interface, and performing steps comprising:
receiving a packet through the higher level interface or from one of the multiple network interfaces;
determining a destination address of the packet;
locating the destination address in the database;
determining, by reference to the database, the corresponding port; and
processing the packet with reference to the corresponding port, including:
placing the packet onto a received packet queue,
requesting a first queueservicing thread to process the received packet queue, and
processing the received packet queue with the first queue-servicing thread for a limited duration,
requesting a second queue-servicing thread after the limited duration if the received packet queue contains at least one queued packet, and
processing the received packet queue with the second queue-servicing thread.

7. A computing device for bridging multiple network segments and exposing the multiple network segments as a single network, the computing device comprising:

multiple network interfaces connected to the multiple network segments;

a database comprising a network address and a corresponding port through which the network address can be reached; and an intermediate network interface driver for exposing the multiple network segments as the single network through a higher level interface;

wherein the intermediate network interface driver performs steps comprising:
identifying a root bridge with reference to a lowest bridge identifier;
identifying a root port with reference to a most efficient network route to the root bridge;
identifying a designated port with reference to a connection to one of the multiple network segments through which a packet is received for forwarding to the root bridge; and
blocking a port if the port is neither the root port nor the designated port.

8. A computing device for bridging multiple network segments and exposing the multiple network segments as a single network, the computing device comprising:

multiple network interfaces connected to the multiple network segments;

a database comprising a network address and a corresponding port through which the network address can be reached; and an intermediate network interface driver for exposing the multiple network segments as the single network through a higher level interface;

wherein the multiple network interfaces are granted a memory segment through a dynamic memory allocation method, the dynamic memory allocation method comprising:
receiving a memory segment request for the memory segment from a first network interface of the multiple network interfaces;
determining a fair share of memory of the first network interface;
determining a safety buffer of memory;
granting the memory segment if a first network interface memory allocated to the first network interface is less than the fair share of memory of the first network interface and an available memory segment exists; and
granting the memory segment if the first network interface memory allocated to the first network interface is greater than the fair share of memory of the first network interface and the available memory segment is greater than the safety buffer of memory.

9. A computing device for bridging multiple network segments and exposing the multiple network segments as a single network, the computing device comprising:

multiple network interfaces connected to the multiple network segments;

a database comprising a network address and a corresponding port through which the network address can be reached;

an intermediate network interface driver for exposing the multiple network segments as the single network through a higher level interface; and a user interface, comprising:
a user interface element for each of the multiple network segments,
a function selection element for bridging at least two of the multiple network segments into the single network, a user interface element for the single network, and a property presentation element for providing the user access to a property of a selected network, the selected network being one of the multiple network segments or the single network;

wherein the selected network is the single network, and wherein the property presentation element comprises an item selection element for bridging another of the multiple network segments into the single network.

10. A computing device for bridging multiple network segments and exposing the multiple network segments as a single network, the computing device comprising:

multiple network interfaces connected to the multiple network segments;

a database comprising a network address and a corresponding port through which the network address can be reached;

an intermediate network interface driver for exposing the multiple network segments as the single network through a higher level interface; and a user interface, comprising:

a user interface element for each of the multiple network segments, a function selection element for bridging at least two of the multiple network segments into the single network, a user interface element for the single network, and a property presentation element for providing the user access to a property of a selected network, the selected network being one of the multiple network segments or the single network;

wherein the selected network is a bridged network segment, and wherein the property presentation element prevents the user from accessing an item selection element for editing a higher level networking software or protocol which is active over the bridged network segment.

* * * * *